Aug. 30, 1927.  1,641,101
R. W. SCOTT
AUTOMATIC KNITTING MACHINE
Filed April 14, 1921   13 Sheets-Sheet 10
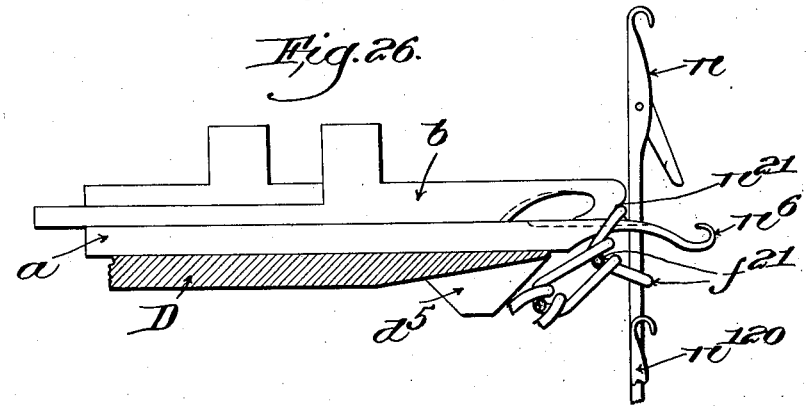
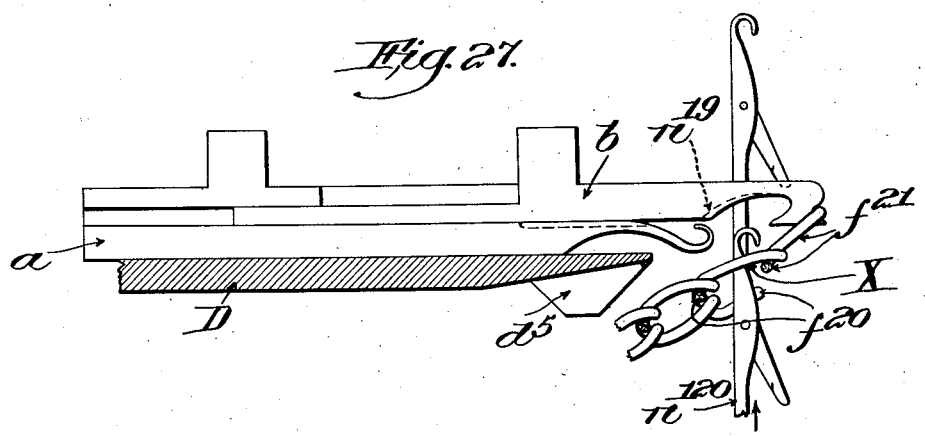
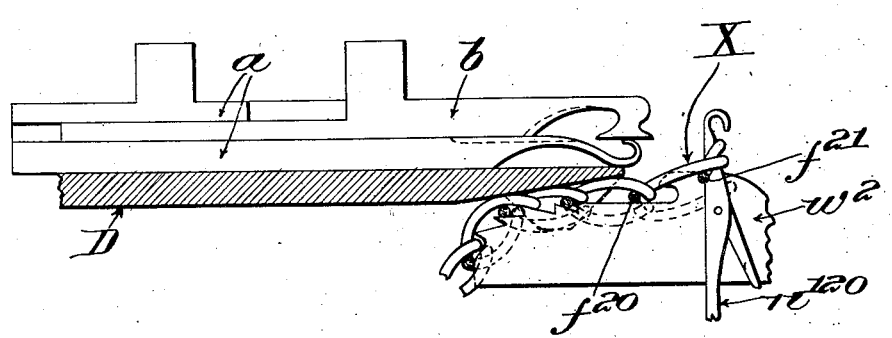
Inventor:
Robert W. Scott,
by Roberts, Roberts Cushman
his Attys.

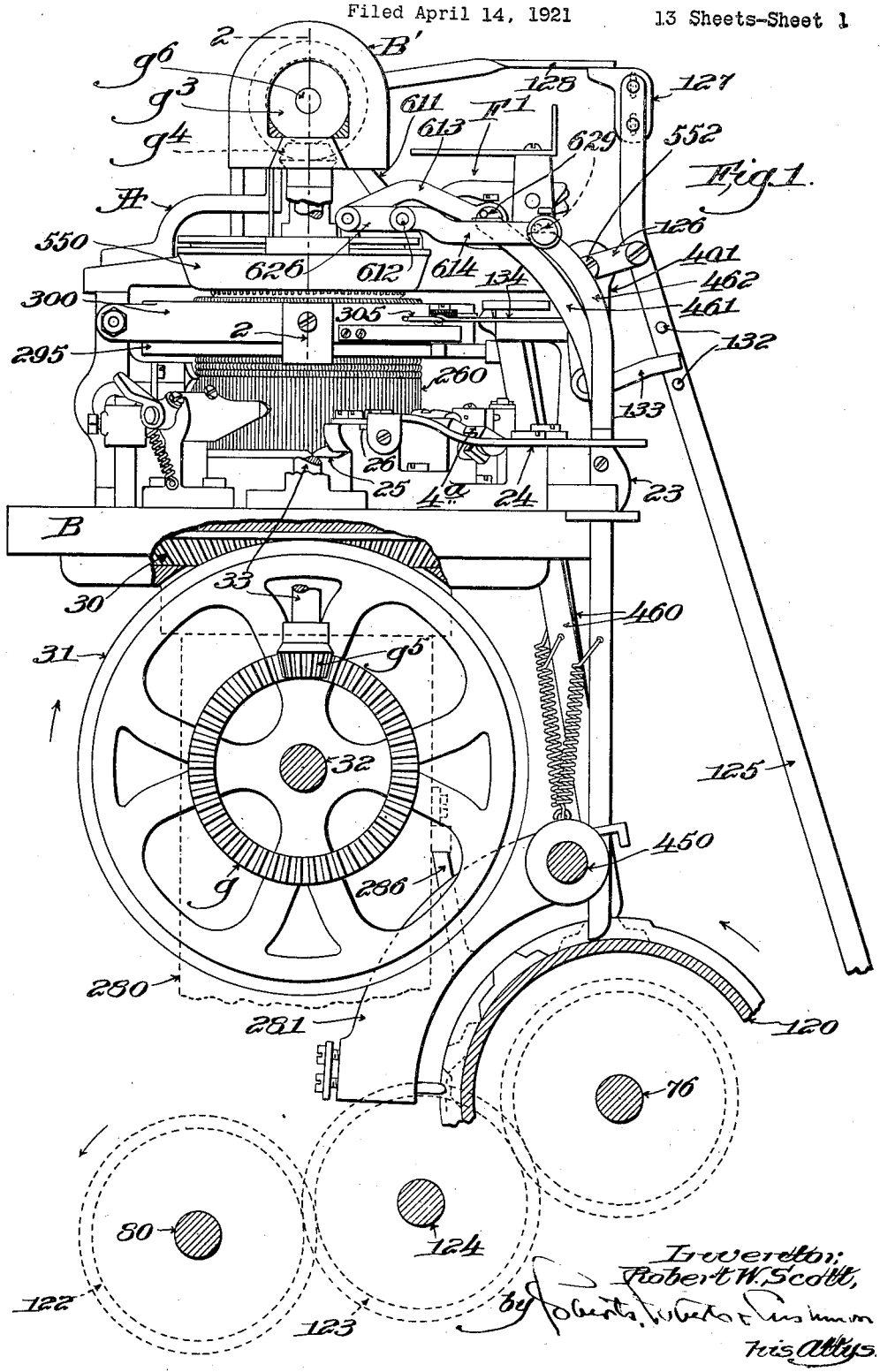

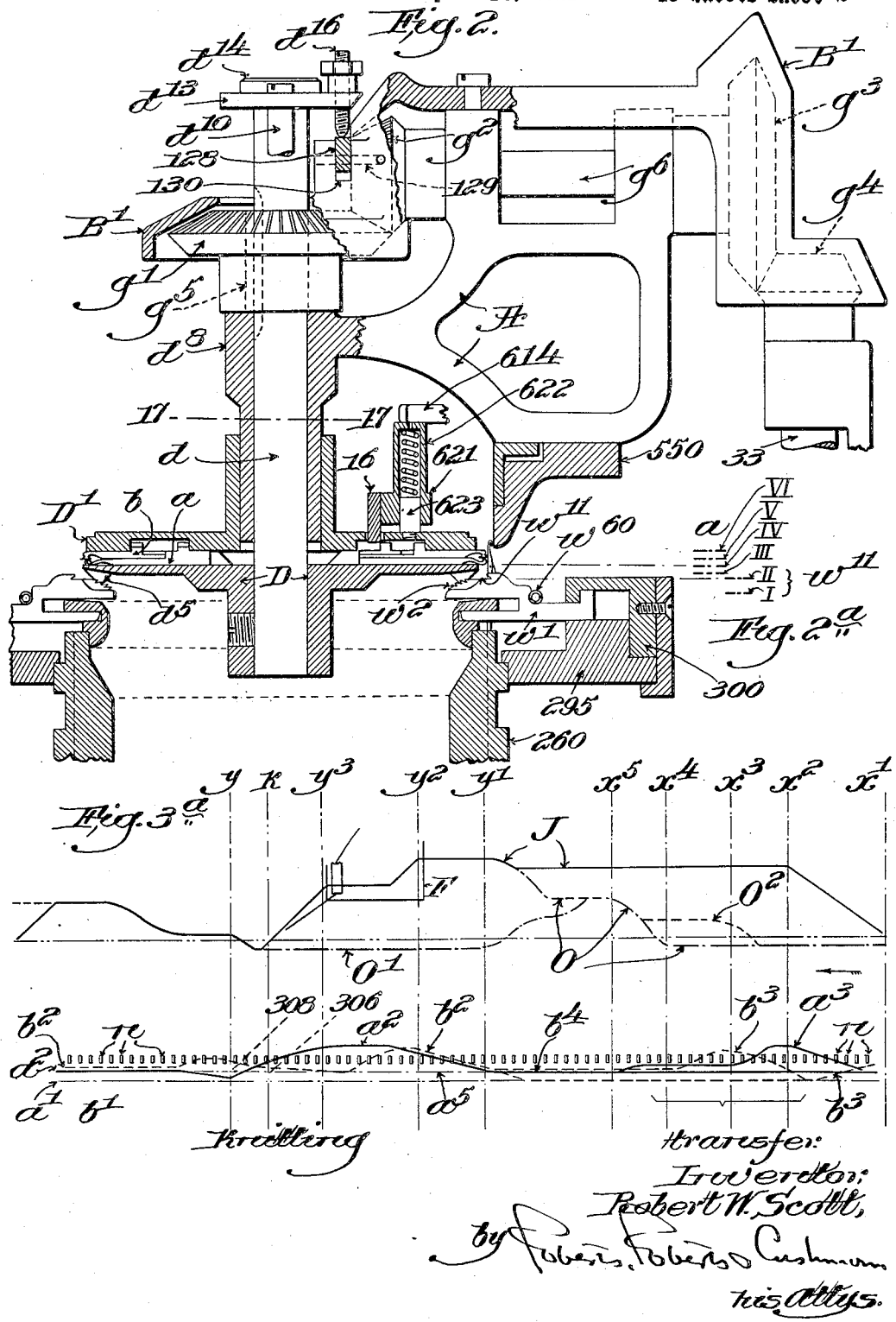

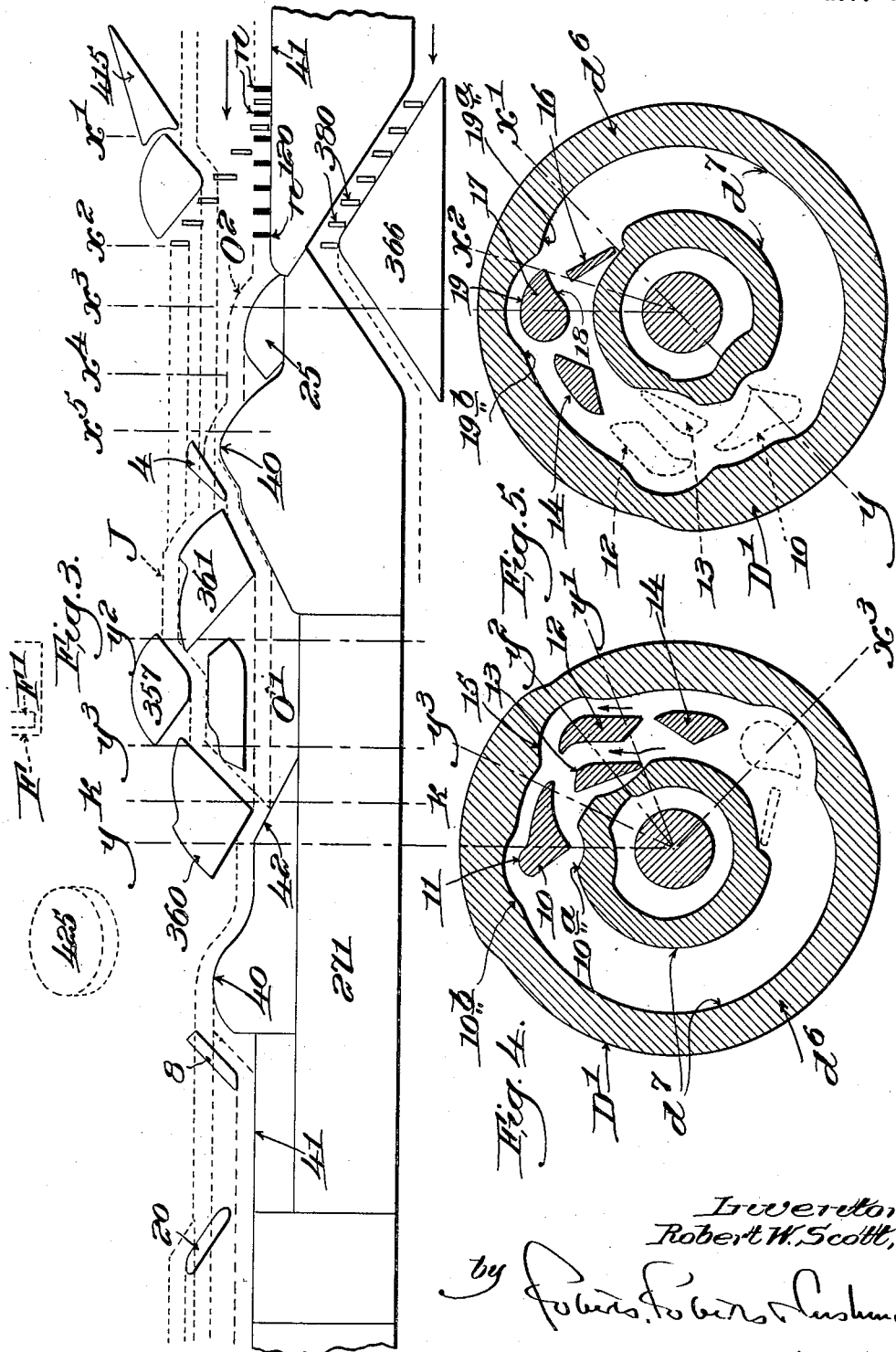

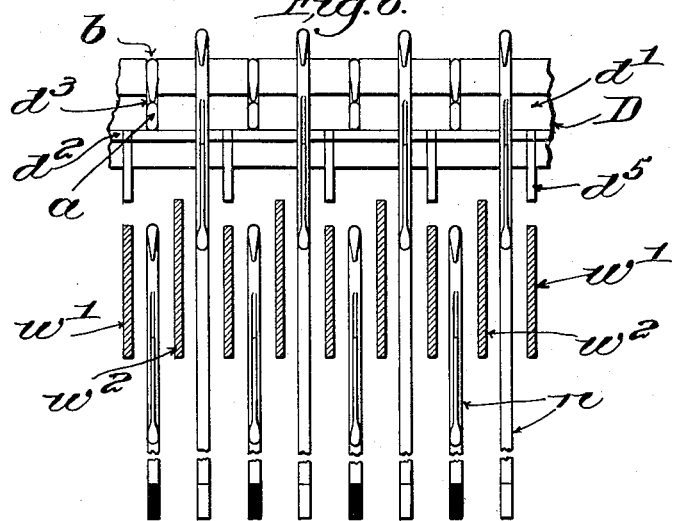
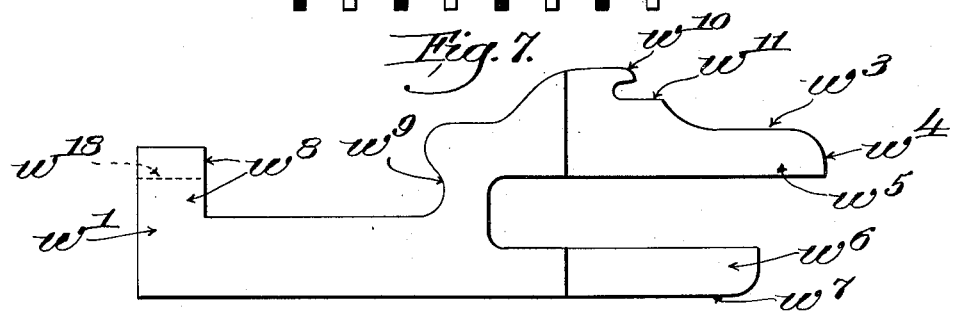
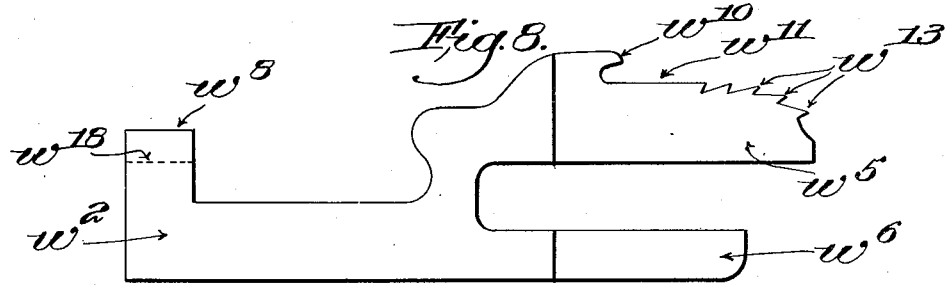
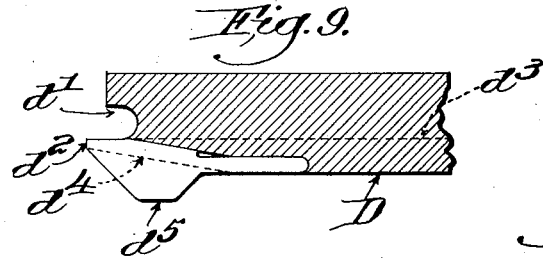

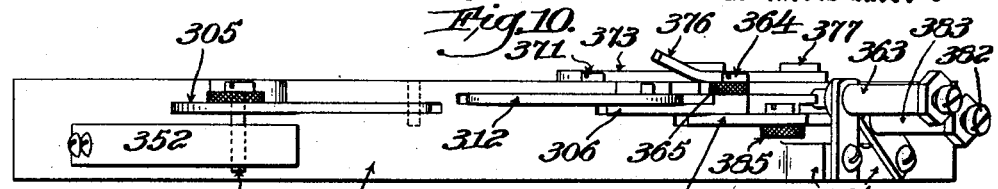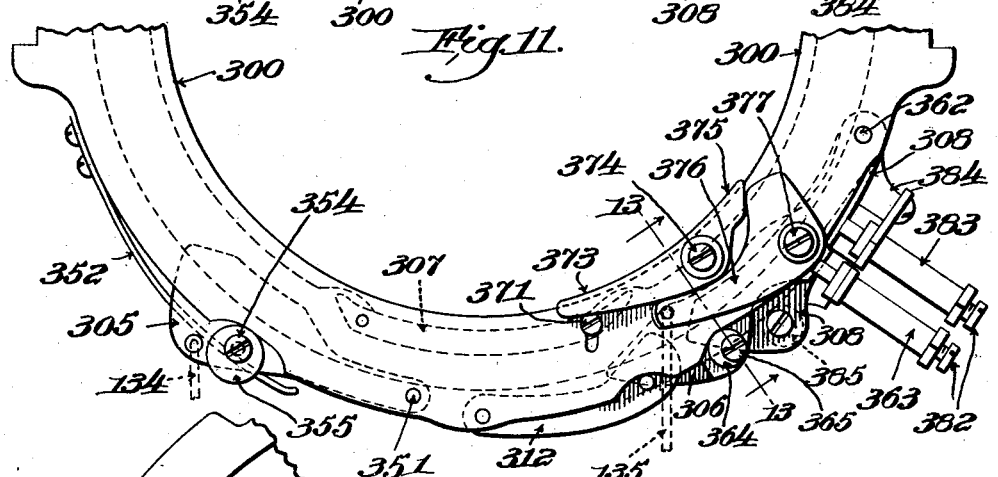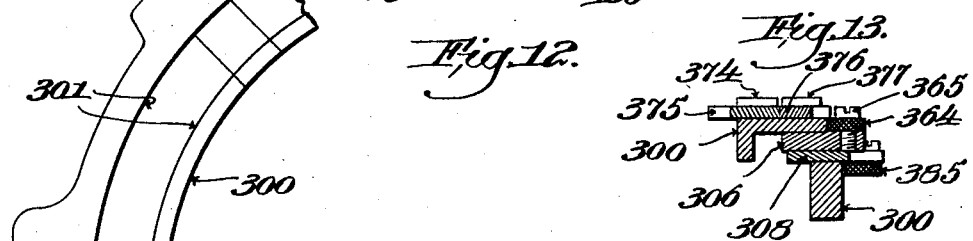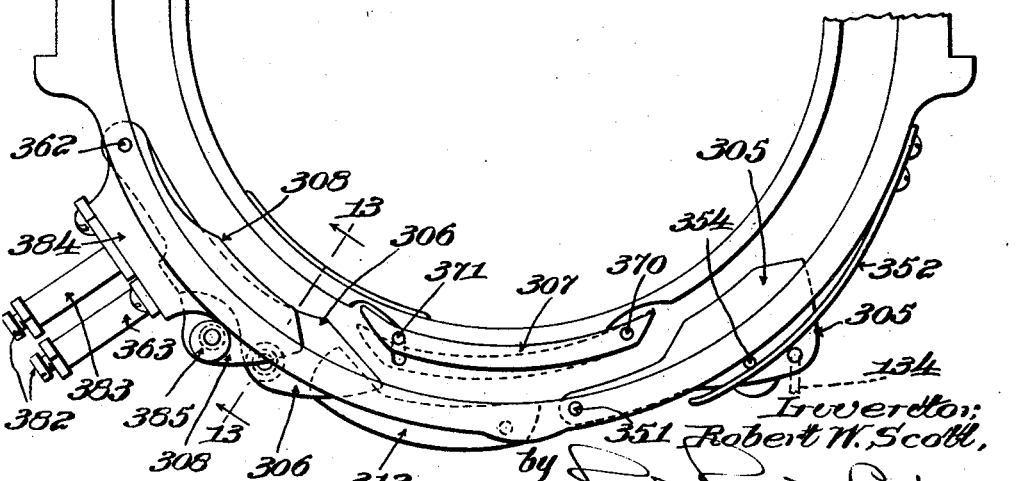

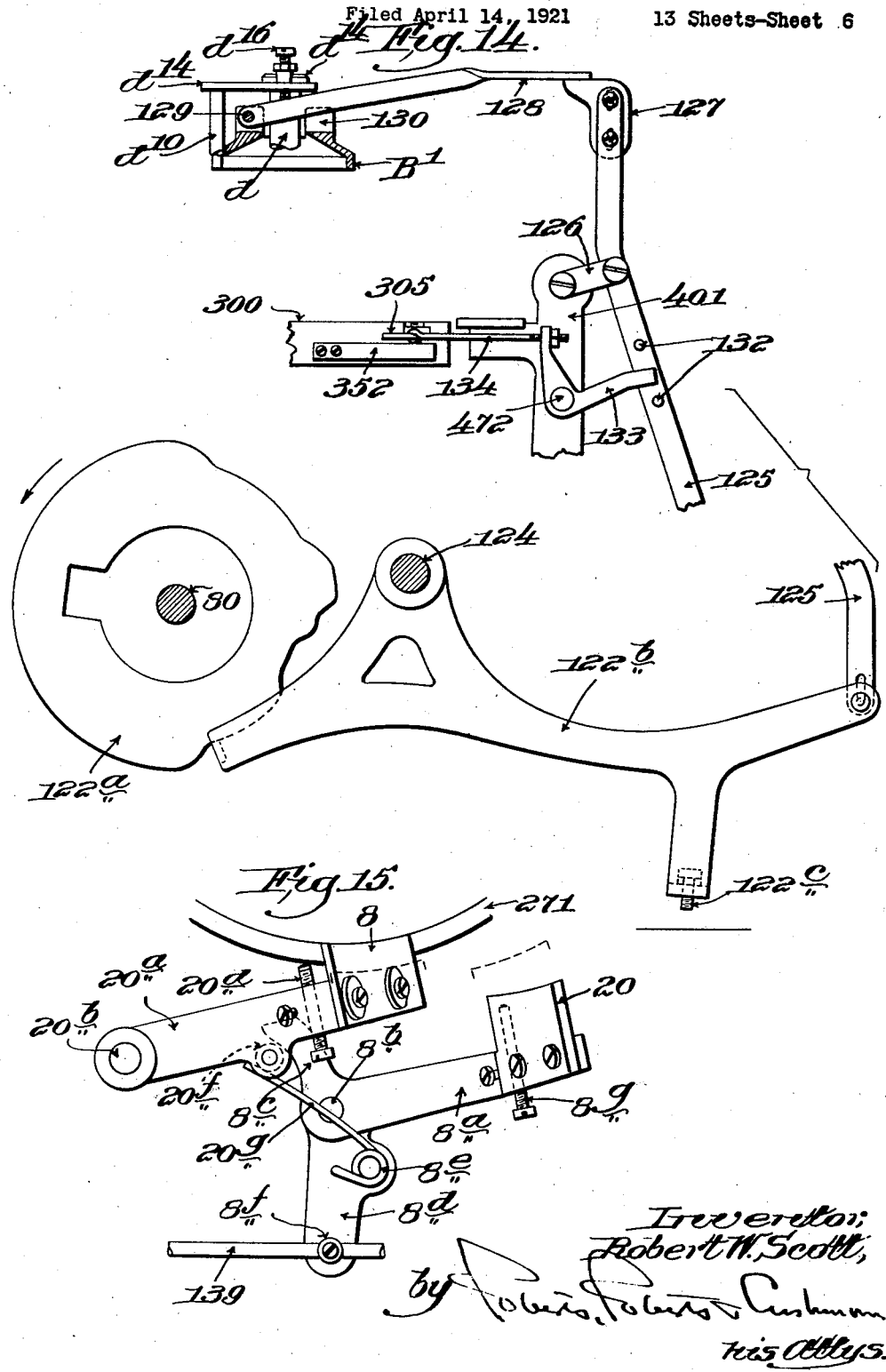

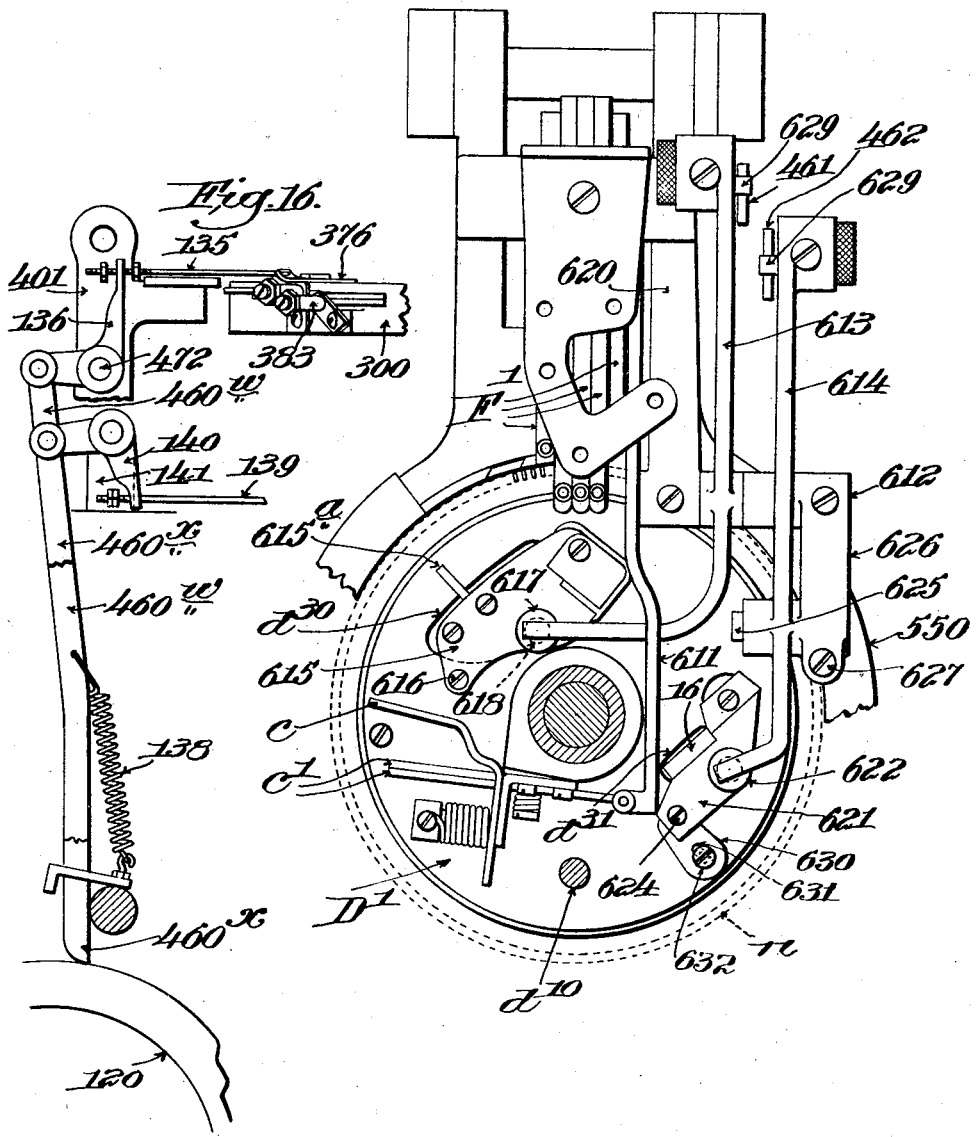

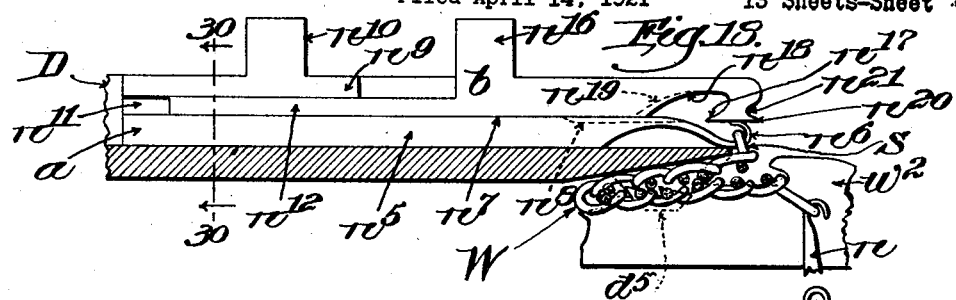

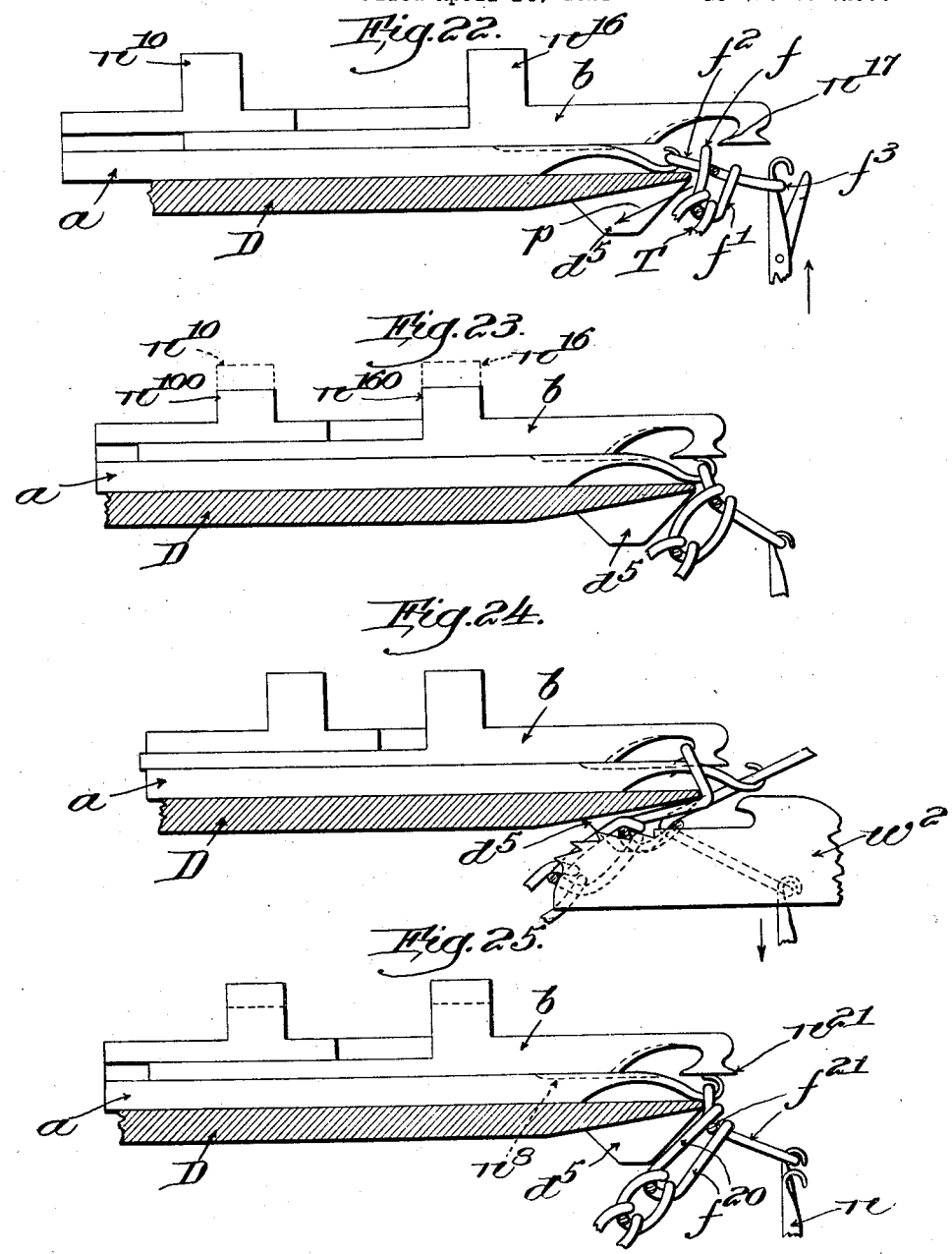

Aug. 30, 1927.
R. W. SCOTT
AUTOMATIC KNITTING MACHINE
Filed April 14, 1921  13 Sheets-Sheet 11
1,641,101
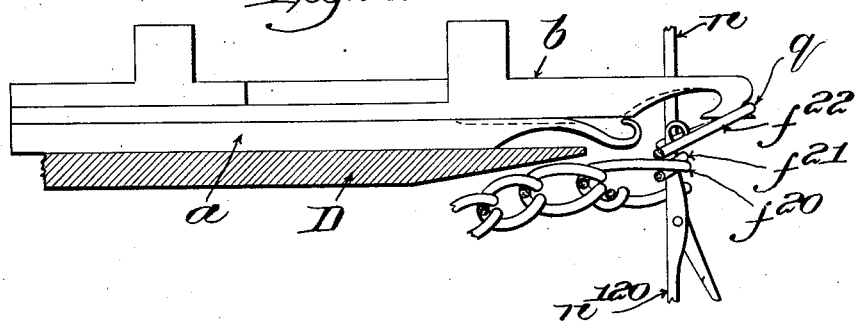
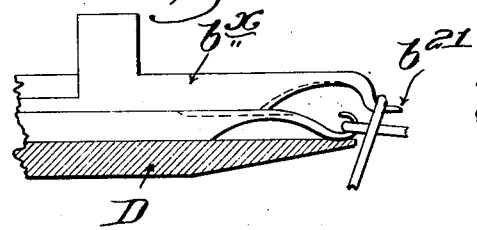
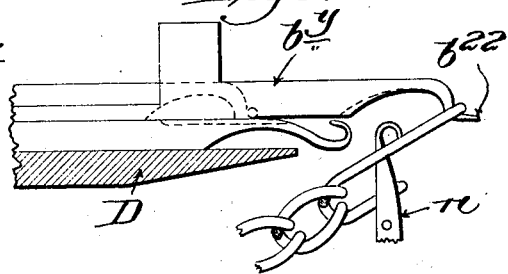
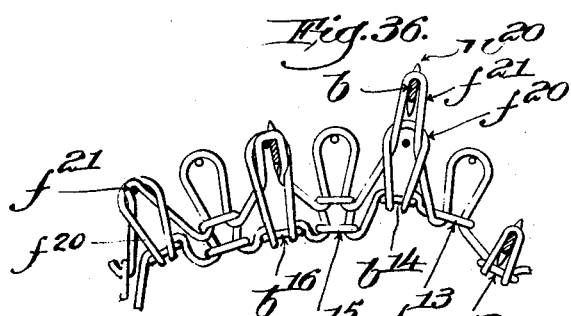
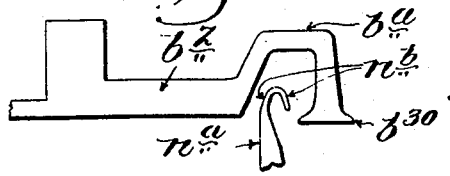
Inventor:
Robert W. Scott,
by Roberts, Roberts & Cushman
his Attys.

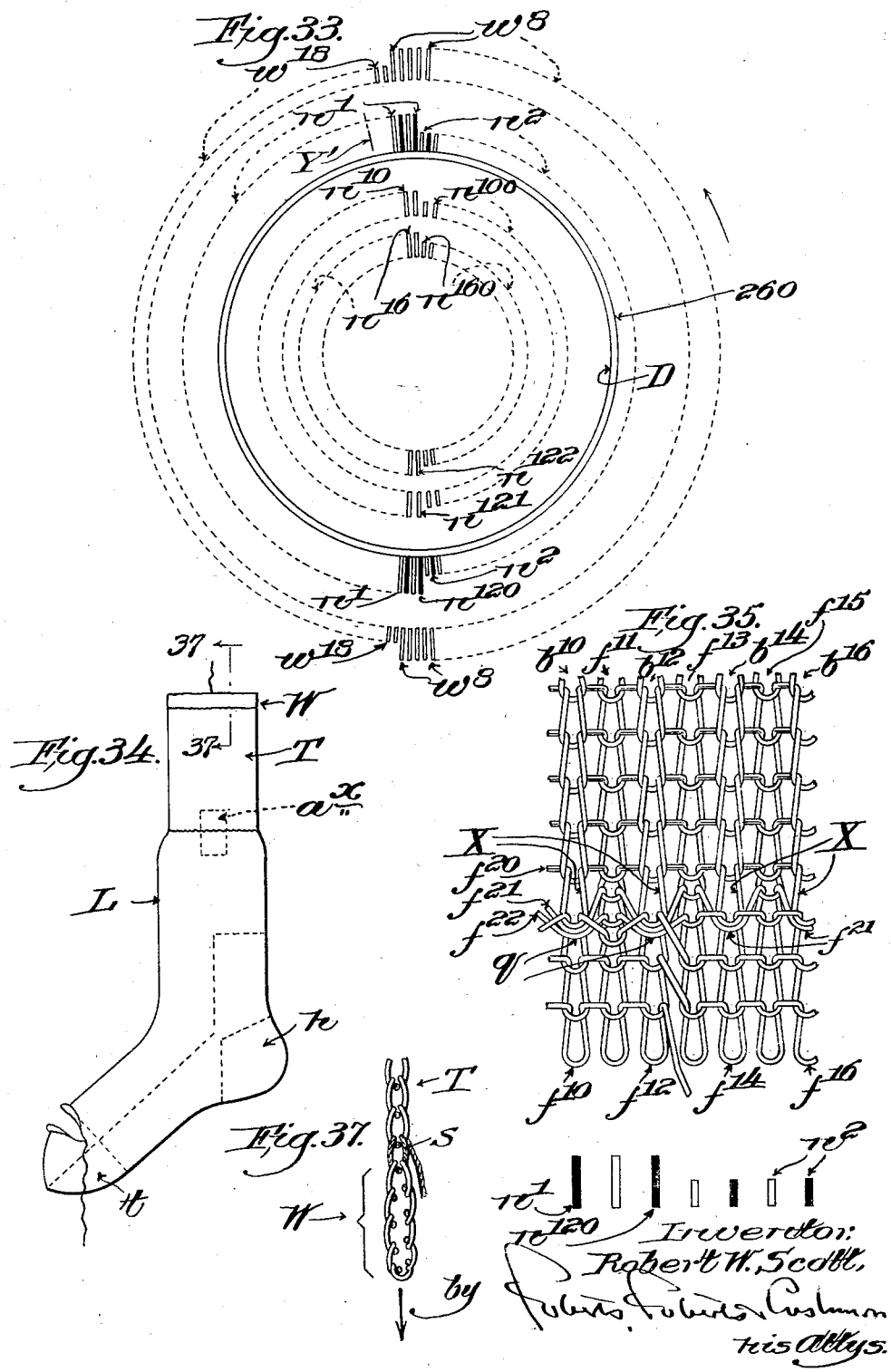

Aug. 30, 1927.

R. W. SCOTT 1,641,101

AUTOMATIC KNITTING MACHINE

Filed April 14, 1921  13 Sheets-Sheet 13

Inventor:
Robert W. Scott,
by Roberts, Roberts & Cushman
his Attys

Patented Aug. 30, 1927.

1,641,101

UNITED STATES PATENT OFFICE.

ROBERT W. SCOTT, OF BABYLON, NEW YORK, ASSIGNOR TO SCOTT AND WILLIAMS, INC., OF NEW YORK, N. Y., A CORPORATION OF MASSACHUSETTS.

AUTOMATIC KNITTING MACHINE.

Application filed April 14, 1921. Serial No. 461,195.

This invention relates to knitting machines adapted to knit ribbed fabric or plain fabric, and especially adapted to knit articles of hosiery containing both ribbed-fabric and plain-fabric parts, as for example, to knit by a continuous operation a stocking of the half-hose type having a rib top with a welt, an integral joint between the rib top and the plain knit leg portion, and the usual or any desired type of heel, foot and toe. The product may, however, be of any sort capable of being formed by circulatory or reciprocating motions on two series of needles, or on either series in turn and the method practiced is capable of variation. I shall herein describe and claim a new and advantageous stocking and the method of making it, as specific instances of the product and method.

One object of the invention is to provide a machine having all of the customary plain-fabric stocking-knitting appliances, such as usually employed in knitting the leg, heel, foot and toe portions of a stocking, with devices also capable of knitting a welted rib top and passing therefrom, by the automatic operation of the machine, into plain fabric for the leg. Another object of the invention is to provide for these purposes improved mechanism adapted for combination with such a machine, in order automatically to produce the ribbed parts of the product. Another object of the invention is to provide, under these conditions, a machine capable of knitting continuously a succession of articles corresponding to the product, each article being complete, except for the closure of the toe seam. Other objects of the invention are to provide for the improved manufacture of ribbed fabric, for the improved formation of tubular welts in ribbed fabric; for the improved formation of loose courses in knit fabric, and for the improved performance of transfer operations, whereby, for instance, a predetermined series of rib or back-wales of the ribbed fabrics may be continued by corresponding wales of plain fabric. A still further object of the invention is to provide improved means for maintaining upon the fabric formed by the machine and in respect to the instruments used a sufficient tension for the most effective operation.

While other objects will appear in the course of the following description, a general object of my invention is to combine devices for automatic coordination for the above and other purposes, and within the severe conditions set by limitations of space and necessity for non-interference between the several agencies of a machine of the circular stocking knitting type, so that the new combination shall still be capable of correct, reliable and automatic performance of all of the old as well as of the new functions reaching the objects above mentioned, and thus be adapted to turn out products of uniform excellence with a minimum of attention by the operator.

The invention includes, for these and other purposes, new knitting instruments for at least one of the series of a rib-knitting complementary pair of series of knitting instruments; new means for actuating these parts for rib-knitting; a new relationship between members of one series of these instruments adapting them not only for improved knitting, but also adapting them for improved transfer function in respect to another series of instruments; and a new relationship between the knitting instruments and their carriers and a new kind of web-holder instruments, with their actuating means, adapted to cooperate for the purpose of aiding the knitting and cast-off functions, and replacing the fabric take-up usual in rib-knitting machines.

These devices are combined with means adapted to the new devices for automatically controlling the length of stitch in a new way, and for automatically adjusting the machine to accommodate its agencies to the successive different parts of its product, as these are produced. Certain automatic operating connections, hereinafter referred to, have also been improved over their prototypes in the course of adapting them to new combinations of devices for the purposes of the remainder of the invention.

The invention is particularly designed to make use of the instruments and perform many of the operations of the hosiery knitting machines of my prior Patents No. 1,152,850 dated Sept. 7, 1915, No. 1,148,055 dated July 17, 1915, and No. 1,282,958 dated Oct. 29, 1918, while the general function may be regarded as an improvement upon and supplement to that carried out by the machine of my Patent No. 834,763, dated October 30, 1906.

I shall now explain my invention in connection with a specific embodiment shown in the accompanying drawings, in which,—

Fig. 1 is a right side elevation of the machine, parts being in section;

Fig. 2 is an elevation partly in section on line 2—2 of Fig. 1 on an enlarged scale;

Figure 38:
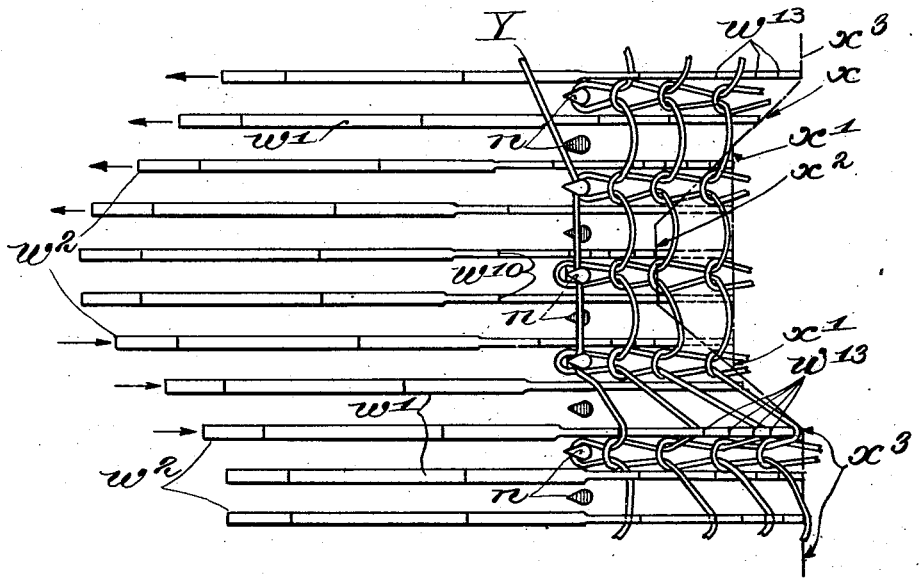

Fig. 2ª is a scale showing different positions of the dial needles and of the cylinder verge and web-holders in relation to Fig. 2;

Fig. 3 is a development of the cylinder cams, showing certain of the needle-butts and their actuating means;

Fig. 3ª is a diagram showing relative motions of cylinder and dial needles;

Figs. 4 and 5 are plans in section through the dial cams showing the preferred relation of the dial cams to the cylinder cams by comparison with Fig. 3;

Fig. 6 is an enlarged exterior development of a part of the dial verge, the fabric tensioning fins or ribs on the dial, the cylinder and dial needles, and the web-holders;

Fig. 7 and Fig. 8 are enlarged elevations of two different kinds of web-holders employed;

Fig. 9 is an enlarged detail of Fig. 2, showing a preferred form of tensioning fin for the dial;

Fig. 10 is a side elevation;

Fig. 11 is a plan, and

Fig. 12 an underplan of the web-holder cam cap;

Fig. 13 a section on line 13—13 on Figs. 11 and 12;

Fig. 14 is a detail right side elevation on a reduced scale of the connections for raising and lowering the dial and for working one of the web-holder cams;

Fig. 15 is a plan view of the mounting for the movable clearing and draw-down cams;

Fig. 16 is a left side elevation on a reduced scale of operating connections for the means shown in Fig. 15, and for another of the web-holder cams;

Fig. 17 is a detail plan partly in section, on line 17—17 of Fig. 2, showing the dial cap and operating connections, the latch-ring, the yarn feeding means, and the yarn severing and clamping means;

Figs. 18 to 23 inclusive are enlarged vertical radial sections illustrating successive positions of the respective needles during the motions for rib-knitting;

Fig. 24 is a similar view showing the position of the parts during making of a loose course;

Figs. 25 to 29 inclusive are similar views showing successive positions of the parts when transferring a dial loop to a cylinder needle;

Figs. 30 and 31 are sections respectively on lines 30—30 of Fig. 18 and 31—31 of Fig. 20;

Figs. 32, 32ª and 32ᵇ show modified forms of dial instruments;

Fig. 33 is a diagram plan showing the relations of the different kinds of operating butts of the knitting instruments;

Fig. 34 is an elevation of a typical product;

Fig. 35 is a diagram back or inside view enlarged of the fabric at area $a^x$ of Fig. 34, showing the cylinder needles in relation to the fabric;

Fig. 36 is a diagram in plan illustrating the relation of the dial and cylinder instruments to the fabric during the transfer operation; and Fig. 37 is a section of the fabric in its forming position, showing the welt, on line 37—37 of Fig. 34.

Fig. 38 is a diagram in plan illustrating a development of a series of web-holders, the needles with which they co-operate, and the fabric with which they co-operate, for explanation of the operation of the web-holders.

The invention, which is capable of use with many different types of knitting machines, will best be understood by explaining the new parts and combinations as employed in relation to the type illustrated by my said Patent No. 1,282,958, and by explaining the operation in connection with one species only of the products capable of being made by it. This description therefore refers to the machine as adapted to make such a rib-top, plain-fabric-leg stocking or half-hose as shown in Fig. 34, comprising the welt W, the rib-top T, the leg L, heel $h$ and toe $t$, the top having as many wales as the leg, and the direction of knitting being from top to toe. The machine is, however, capable of knitting many other fabrics, and of knitting the illustrated fabric in other ways. In the machine shown, the needle carriers rotate and the cams are relatively fixed, but the opposite arrangement is within the invention.

*The machine generally.*—Referring to Figs. 1, 2, and 3, the machine frame parts B, etc., the drive-shaft 32, and connections 30, 31 and $g$, $g^5$, 33, $g^4$, $g^3$, $g^6$, $g^2$, $g'$, respectively for driving in unison the cylinder 260, the dial-spindle $d$ and dial D concentric with the cylinder and rotatable in a bearing $d^3$ of bracket A on the latch-guard 550, may all be substantially as shown in said Patent No. 1,282,958. The ring 550, dial D, and their attachments are pivoted at 552, and may be lifted away from relation to the other parts.

The means for rotating and reciprocating the shaft 32, the pattern-drum 120 and its driving connections 121, 122, 123; the cam-shaft 80 and its attachments, the primary pattern chain (not shown) and the thrust-bars 460 serving as operating connections to parts controlled by drum 120 may be substantially those of said Patents Nos. 1,152,-850 and 1,282,958.

As in said patents, the needles of the cylinder 260 may be divided into a long-butt segment for the instep and a short butt segment for the heel and toe, and for heel and toe knitting may cooperate with automatic yarn-changing means F', with the switch-cam 415, the pickers, the cam-ring 271 and the knitting cams 357, 360, 361, Fig. 3, as therein explained, to knit plain-fabric hosiery articles, with narrowed and widened heels and toes if so desired. The cylinder needles may be any desired type of needle, shown as latch needles $n$, having long butts $n'$ and short butts $n^2$, see Fig. 33. Recurrent needles among these, shown as alternate needles, are ever-active needles, and are provided with jacks 380 actuated by a cam 366, adapted to lift them above a normal level 40, at which their latches are not cleared of the previous loop, to a level high enough to clear their latches. The upper surfaces of the respective stitch-cams 360, 361, lift and clear the latches of all needles reaching them. In the diagrams, ever-active needles and butts are shown in open outline, and the occasionally-active needles or butts are indicated in black.

The drum 120 is moved, when permitted to be moved, in time with the passage by certain points of the cam-ring of the long-butt or the short-butt segments of needles, and at these points respectively operating cams 4 and 25, 8 and 20 are movable (by appropriate connections to cams on said drum) toward and from the needle-cylinder in stages, to permit their partial insertion during passage of the short-butts, to first operate the leading long-butt needles, and to permit complete insertion before passage of the short-butts. Their withdrawal is in similar stages, to last operate the following end of the long butt segment, for instance; the means for so moving the cams may be the same as explained in Patent No. 1,148,-055. The dividing cam 4, Fig. 3, is so operated for the purpose of determining whether the needles without jacks shall pass above cam 361 and be active, or shall idly pass beneath the knitting cams, respectively.

Other needle cams presently mentioned are similarly operated. The times of all operations are thus related to motions of drum 120, or shaft 80, or their attachments, as induced by the primary pattern chain.

The needle cylinder is vertically movable in respect to the dial D, the latch-ring 550 and cam ring 271 for the purpose of altering the relation of the cylinder and dial, and also for altering the relation of the limits of the vertical stroke of the cylinder needles to the knocking-over line at the verge of the cylinder. This line is determined by the upper surface of web-holders, presently mentioned, working between the needles, and bearing on an attachment of the cylinder. The effect of lowering the cylinder is to lower the web-holders and relatively to raise the top and bottom limits of the motion of the needles in respect to the web-holders. Means for automatically raising and lowering the cylinder preferably comprise the lever 281 pivoted on the frame stud 450, and having arms 281 and 286 respectively contacting with cams on drum 120 and with a lug on a tube 280, upon which the bottom bearing for cylinder 260 rests, all as shown in my Patent No. 1,152,850 above, and my Patent No. 1,189,-220 dated June 27, 1916.

Motion of the needle cylinder vertically is made use of in connection with changeable positions of the dial, for new purposes explained below, as well as for the usual purposes.

*The needle dial.*—The dial D, see Figs. 2, 6, 9 and 16, is rigidly attached to the dial spindle $d$, is radially grooved at $d^3$ for its knitting instruments, and is peripherally grooved at $d'$ to define a narrow circular verge $d^2$ an appropriate short distance concentrically within the space defined by the backs of the cylinder needles $n$. The bottom surface of the dial slopes upwardly at $d^4$ to define the narrow verge $d^2$.

There are in the dial at least as many grooves $d^3$ as there are jackless or occasionally-active cylinder needles $n$. During rib-knitting, these jackless needles are withdrawn, by the dividing cam 4 and the groove under the leading switch cam, beneath the level of the dial needles, Fig. 6. The relative rotative positions of cylinder and dial are such as to bring the dial grooves $d^3$ into the same radial planes as the cylinder grooves for the jackless needles. The ever-active cylinder needles $n$, those with jacks, thus work in the radial planes bisecting the angles defined by adjacent dial needles $a$, $b$, and with them constitute the face-wale series of needles and back-wale series of needles respectively cooperating with the yarn to knit ribbed fabric. As shown, there are as many dial needles as there are ever-active cylinder needles, and the rib pattern is one-and-one.

The dial needles are operated by cams on the relatively stationary cam-cap D', as presently explained.

*The web-holders.*—The cylinder is provided with a web-holder bed 295 and web-holders $w$ of two kinds, $w^1$ and $w^2$, Figs. 7 and 8, one web-holder working or lying in a radial plane between every pair of the needles $n$; and hence lying in the plane bisecting the angle between a dial-needle groove and the ever-active needle on each side of it. In such of these planes as lie on one side only of a dial needle groove, the under surface of the dial is provided with downwardly projecting fins or partitions $d^5$, which may be thin pieces of metal fast in radial grooves of the dial, and each having a beveled outer face and smooth lower edges. These fins thus lie directly over the positions of certain of the web-holders, for example, of the alternate web-holders marked $w^1$, Fig. 6. When the rib pattern is one-and-one, as shown, the fins $d^5$ are as numerous as the dial needles, or the ever-active needles, and are displaced from the dial grooves and the ever-active needles through one-quarter of the angular distance between the dial needle grooves, and similarly displaced in the opposite direction from the ever-active needles. For other patterns of rib, alternate dial grooves may be disused or not provided, but half as many fins as there are web-holders are preferably provided in any case.

The alternate web-holders under the fins $d^5$ are plain web-holders such as shown at $w^1$, Fig. 7, having upper arms recessed at $w^3$, below the level $w^{11}$ of the throats under the hooks $w^{10}$ serving to prevent rise of the fabric with the needles, and having rounded inner ends $w^4$. Otherwise the web-holders $w^1$ are of any desired type, but preferably are of the straight sliding type each provided with an upper arm $w^5$, a parallel lower arm $w^6$ having a straight bottom $w^7$, and have operating butts $w^8$, some of which may be short butts $w^{18}$, and a notch $w^9$ for a spring band $w^{60}$, Fig. 2. In these respects the web-holders, as well as the web-holder supporting and guiding means, may correspond to the disclosure of my application Serial No. 372,387, filed April 9, 1920 (Patent No. 1,467,671, September 11, 1923).

The function of the web-holders $w^1$ is that usual in the art, the fabric being held down by the hooks $w^{10}$ against rising with the needle and the knocking-over line being established in respect to the level $w^{11}$ of a web-holder slightly withdrawn in respect to a downgoing needle. The web-holders $w^1$ are placed recurrently among the other web-holders $w^2$ as frequently as necessary to provide a web-holder $w^1$ for each fin $d^5$.

The web-holders $w^2$ are tensioning web-holders, which have the arms $w^5$, $w^6$, the hold-down hooks $w^{10}$, the upper surface $w^{11}$, and the operating butts $w^8$ or $w^{18}$, but the inward end of the arm $w^5$ is not recessed. On the contrary, this arm is roughened, serrated or provided with forwardly projecting points $w^{13}$, preferably arranged in rounding relation about the end of the upper arm $w^5$, and adapted on the forward stroke of the web-holder to engage and feed forward with the web-holder fabric extending from the region of the surface $w^{11}$ within and over the end of the arm $w^5$, and to release the fabric on the rearward stroke. That is to say, this action takes place when the fabric is properly presented to the tensioning web-holders $w^2$. This occurs when the dial is low or the cylinder is high so that the partitions or fins $d^5$ on the dial then serve to force the fabric downward between each pair of web-holders $w^2$ and into certain engagement with the fabric-feeding serrations $w^{13}$ of the tensioning web-holders $w^2$. Fig. 2 shows the dial at the position marked IV in the scale, Fig. 2$^a$, which is the preferred position, for instance, toward the end of knitting of the welt, the cylinder then being at a high position II. As shown in Fig. 2, the fins $d^5$ present the leading end of the fabric (e. g., the edge fold of a welt) in position for certain engagement by the serrations of the web-holders $w^2$. If these web-holders are now making their normal short movement, the serrations $w^{13}$ will engage and evenly arrange the leading edge fold of the fabric and feed it inward and downward as it grows, and thus be prepared, upon closer approach of cylinder and dial (when the dial moves down to position III, for instance) to engage the fabric firmly between every dial wale and the cylinder wale next to it on one side, at a point nearer the needles, upon the withdrawal abnormally of these web-holders for the purpose of exerting their full tensioning effect during rib knitting. This preparatory arrangement of the leading edge of the fabric is advantageous to the product as well as important to certainty of operation, as more fully explained below.

When, either by lowering the cylinder 260 or elevating the dial D, the fins $d^5$ are moved substantially above the position indicated in Figs. 2 and 6 with relation to the plain web-holders $w^1$, then the operation of the web-holders does not differ from the well-understood usual operation resulting from the usual relation of web-holders to the needles and to the fabric formed by the single set of needles which they interpenetrate.

*Operation of the web-holders.*—The marked take-up or tensile stress on the fabric capable of being effected by operation of the tensioning web-holders $w^2$ will not take place when these web-holders are moved through a short reciprocal stroke, sufficient only for production of the web-holder function, i. e., upon withdrawal only sufficient to determine stitch-length by recession below the levels $w^{11}$ of the hooks of the needles, and to determine knocking-over of the old loops; and upon insertion only sufficient to present the hook $w^{10}$ over the yarn between the loops. In that case the forward motion of the tensioning web-holders $w^2$ after the serrations $w^{13}$ have engaged the fabric may be the same as or less than the length of the new course knit.

At times the web-holders may be given an abnormal stroke by automatically controlled means mentioned below, for the purpose of placing the fabric under tensile stress. For instance, when ribbed fabric is being made, or when loops are to be transferred, it is desirable to place stress on the fabric to pull over the old loop on the dial needles; or to assist knocking-over by the cylinder needles during idleness of the dial needles; or to hold the transferred loops in the hooks of the needles to which they have been transferred.

Referring now to Fig. 38, the operation of the web-holders $w$ and $w^2$ may be understood by following the progression of knitting from yarn Y on a series of instruments therein shown, which correspond to the same instruments illustrated in Figs. 6, 7, 8 and 18. Assume, for example, that knitting is proceeding on the needles $n$ from top to bottom in Fig. 38, alternate needles $n$ only being active (as will be the case when making a welt, Fig. 18, for example). All of the web-holders, which normally are withdrawn at $x$ to the maximum radial position illustrated by the line $x^1$, are now being withdrawn to the abnormal position $x^2$. The recesses between points $w^{13}$ of the serrated section of the web-holders $w^2$ engage the previously formed fabric, and upon the web-holders being projected at $x^3$ to the normal extent, the result will be to place the wales from the needles $n$ on either side of the web-holders $w^2$ under an abnormal tension sufficient for the purpose explained.

The operations indicated in diagram in Fig. 38 have been simplified by conventionally illustrating a short segment of the instruments developed into a straight series, but it will be understood that the diagram applies as well to needles in a circular series, and web-holders in radial position.

Where the fabric is not in course of growth, at places away from the waves of motion in the needles, it is desirable to maintain a gentle pressure on the fabric.

Where it is desired to make loose courses, this invention provides for doing this by placing pressure upon the fabric while the cylinder needles are still drawing yarn from the source of supply, so that the knocked-over cylinder stitch pulls the new or incoming yarn between the cylinder and dial needles toward the center of the machine. For this purpose, the tensioning web-holders are inserted in a wave earlier in phase, in respect to the knitting-wave, than normal, to press upon the fabric during and after knocking-over on the series of needles which knit in primary relation to the other series; as shown, the cylinder needles are the primary needles.

During plain-fabric knitting, the stress upon the fabric is maintained by the web-holders in the usual way, and is sufficient to cause the fabric to pass downwardly within cylinder 260. Means for giving the related motions to the cylinder and dial and the web-holders may be provided as follows:

Referring now to Figs. 1, 2, 10, 11, 12, 13 and 14, adjusted positions in a vertical sense and vertical motions of the dial may be secured by any convenient automatic connection under control of pattern surfaces of the machine, such as cams on or rotating in unison with the main cam shaft 80. A preferred connection for this purpose comprises an appropriate cam $122^a$, Fig. 14, attached to the face of the gear 122 on the end of the shaft 80, a rocker lever $122^b$ pivoted on the stud 124 and having one end in contact with cam $122^a$, a screw stop $122^c$ reacting with the machine frame, and having a vertical operating connection 125.

The connection 125 passes up behind the drum 120 to a link 126 pivoted to the connection 125 and to the latch-ring pivot post 401. The upper end of the connection 125 is provided with an adjustable piece 127 taking under a lever 128 pivoted at 129 in the fore and aft slot 130, see Fig. 2, formed in the gear-casing B' forming a part of the bracket A attached to the latch ring 550. The lever 128 thus stands between the upward extension of the dial spindle $d$ and the gear $g^2$ forming a part of the driving train therefor. The dial spindle is splined at $g^5$ to slide through and rotate with the gear $g^1$, and is provided with an arm $d^{13}$ held to a bearing upon the upper end of the dial spindle $d$ by a cap $d^{14}$ fastened through a bore in the arm $d^{13}$ to the dial spindle $d$. The arm $d^{13}$ carries a downwardly extending adjustment screw $d^{16}$ lying above the lever 128, and is also provided with a steadying connection $d^{10}$ extending through a hole in bracket A to the dial cap D' presently mentioned. These arrangements are such that up and down motion of the rear end of the lever 128 will move the dial (and the dial cap resting upon its upper face) vertically through the desired small distances, in time with the rotary motions of the gear 122 and cam $122^a$.

It will be observed that the vertical motions of the cylinder 260, controlled through the lever 281 and the drum 120, are thus coordinated with the means for vertically positioning the dial.

The connection 125 carries on one face pins 132 for a lost-motion connection with one arm of the bell-crank lever 133 centred on the stud 472 and having an upwardly extending arm adapted to operate a link 134 for moving a cam on the web-holder cam cap 305 presently described. It will be observed that this arrangement is such as to enable the dial to be positioned as desired by motions of connection 125 through an upper range of its movements; and to enable the connection 134 to be pulled upon during a lower range of its movements. Surfaces on the cam 122$^a$ for operating both the dial positioning means and the web holder cam positioning means can thus be accommodated, since these parts are operated consecutively.

The web-holder actuating devices are comprised of means for resiliently giving the web-holders inserting and positively giving them withdrawing motions, preferably supplemented by the spring band $w^{60}$ encircling the web-holders and in the notches $w^6$, for maintaining tension on the fabric at other points than at the waves of motion in the web-holders. In each instance the inthrow or active phase of the wave of motion in the web-holders is caused by a spring-held cam or the spring band $w^{60}$. The strength of these spring pressures measures the maximum effort of the web-holders, and this maximum effort is less than the force necessary to rupture the fabric.

Referring now to Figs. 10, 11, 12, 13 and 14, the web-holder cam cap 300 is provided with a concentric groove 301 for the butts of the web-holders and with the web-holder withdrawing cam 307 pivoted at 370 and having an actuating pin 371 taking through a slot 372 for actuation by a lever 373 pivoted on the upper face of the web-holder cam cap at 374. The tail 375 of the lever 374 is acted upon by one arm of a bell crank lever 376 pivoted at 377 and actuated by a connecting rod 135, (see Fig. 16) passing through a hole in the upper arm of bell crank lever 136 pivoted on the left hand end of the stud 472, and adapted to be actuated by a thrust bar 460$^w$ in contact with cams 137 on the drum 120. Preferably the bar 460$^w$ is held down by a tension spring 138.

So much of the connection as described provides for the positive pattern-operated control of the position of the cam 307. When thrown outwardly, the effect of the cam 307 is to withdraw all of the web holders further than normal, thus to cause a longer stroke of the web-holders in respect to an inward throw of all the web-holders caused by cams presently to be mentioned, which inward throw is not altered by the motion of the cam 307.

The web-holder cam ring also carries the inthrow cams for the web holders shown at 306 and 308. These cams are pivoted in horizontal slots in the web-holder cam cap on the pin 362, and are so placed as to contact with all of the butts of the web-holders when they are in their inner positions shown at Fig. 12. This inward position for these cams is attained by the adjustable spring pressure of adjustable spring plungers 383 and 363 respectively. The plungers 363 and 383 are carried by brackets 384 and the inward throw of the cams 306 or 308 is respectively determined by the eccentric stops 364, 385, carried by the respective cams 306 and 308.

The cam 306 is adjusted about its pivot 362 by the operating lever 376 and the connection 135, 460$^w$, when the lever 376 is drawn further outward by the connection 135. Having first acted on the tail 375 of the lever 373, the lever 376 may be then arranged, as best shown in Fig. 13, to encounter the screw 365 on the cam 306 and move this cam outwardly. For the present purposes, the cam 308, being normally positioned for the inward phase of the web-holder motions, is not operated except by its spring plunger 383, but it is obvious that said cam might be automatically operated by a still further motion of the lever 376 against an upward continuation of the screw stop 385, if it should be so desired.

*Variation of stitch-length by the web-holders.*—The web-holder cam cap also carries, as usual, the pivoted cam 312 so positioned when held inward as to act on the longer butts $w^8$ of the web-holders only, for instance of the segment associated with and overlapping the short-butt needles, see Fig. 33, to cause them to be inserted at an early time in respect to the stitch cam, to determine longer stitches in certain segments only of the fabric, e. g., during splicing on the corresponding needles.

The inthrow cam 306 is in an angular sense in advance of the normally placed inthrow cam 308, and when in the position shown in Fig. 12, the effect of this cam, see Figs. 3$^a$, 24 and 25, is to throw in the web-holders at an earlier time in respect to the operation of the cylinder stitch cam. If the cam 307 is outwardly displaced at this time, the tensioning web-holders $w^2$ and the web-holders $w^1$ will make a long stroke ending inwardly at the normal place, but the early timing of the advancing phase of the wave caused by the cam 306 will result in pressing inwardly the fabric by the action of serrations of the web-holders $w^2$, while the needles next to this web-holder are still drawing their new loops, and after they have cast off. If rib knitting is proceeding under these circumstances, the result is to take a great deal of yarn into the rib course, for instance, $f^{20}$, Figs. 24, 25, 35 and 36, affected by the operation of the cam 306. By this means I am enabled accurately to form the desired number of courses of loose stitches for a transfer operation presently to be explained.

The normally placed web-holder cam 308, being forced inwardly with an adjustable force by spring plunger 383, may be relied upon, when the cam 307 is displaced outwardly, to exert upon the fabric through web-holders $w^2$ a take-up tension not exceeding the maximum permitted by the force of the plunger 383. Adjustment of the spring by screw 382 fixes accurately the tension desired.

*Aid of web-holders in transferring.*—The web-holder cam cap also carries an inthrow cam 305 at a point in advance of the stitch cams, coincident with the place of operation of the dividing cam 4, and following the needle-advancing phase of transfer devices described below. Cam 305 is pivoted at 351 and is held inward by a leaf spring 352 acting on a pin 354 in the cam. Inward motion of this cam is limited by an adjustable stop 355, and outward motion and inward release are automatically effected by the link 134, and the connection 133, 125, 122$^b$, to cam 122$^a$, Fig. 14. When in use, cam 305 holds the web-holders inward to place pressure on stitches transferred to the cylinder needles during the drawing-down movement of the needles at dividing cam 4.

Outward motion of the courses preceding these held inward by the web-holders, which takes place during transfer at the wave $b^3$, Fig. 3$^a$, is not interfered with by the web-holders, which yield against the tension of band $w^{60}$, and serve to maintain enough tension only on the transferred loops to make the position and the open state of these loops certain.

*The dial needles.*—The instruments of the dial for many purposes of this invention may be any kind of needle. Preferred needles, such as those shown, are particularly adapted to perform a transfer operation, and particularly adapted for rib knitting as members of a secondary series of rib-knitting needles. In my application Serial No. 378,233, filed May 1, 1920, (Letters Patent No. 1,385,929, July 26, 1921) I have described and claimed two-part needles of the general type which I prefer to use in the dial of my present machine. I have improved the construction of these needles to enable them to transfer their loops, and for the coaction of their two members with each other and with needles of the cylinder series.

Referring now to Figs. 18, 20, 30 and 31, the loop-drawing or hook member $a$ may comprise a shank $n^5$ having a hook $n^6$, facing upwardly toward the line $n^7$ of the upper face of the shank $n^5$, and having a groove $n^8$ on its upper face for an independently movable point member $b$ adapted to cooperate with yarn loops received or drawn by the hook $n^6$. In the preferred construction herein shown, shank $n^5$ near its butt end is upwardly extended at $n^9$ and bears a butt $n^{10}$, the member $n^9$ being grooved at $n^{11}$ in line with the upper face $n^7$ of shank $n^5$, and through about half the thickness of the shank $n^5$, and thus being adapted to receive and position laterally and vertically a slightly bent spring tail $n^{12}$ of the cooperating member $b$. The member $b$ is provided with an operating butt $n^{16}$, and with a backwardly-facing loop-penetrating and carrying point $n^{17}$ defined by a throat $n^{18}$. The shank may be beveled away on one face at throat $n^{18}$, as shown at $n^{19}$. The member $b$ is further provided with an end point $n^{20}$, which may define with the rounded fore part of the needle a notch $n^{21}$. The member $b$ at and between points $n^{17}$, $n^{20}$ is reduced in thickness to enter groove $n^8$, as shown in Fig. 31. The notch $n^{21}$ may in some cases merely be the angle between the point $n^{20}$ and the general contour of the head end of the member $b$, as shown in Figs. 32 and 32$^a$.

The needle members $a$ and $b$ are assembled together in a dial groove, the interlocking groove $n^{11}$ and the tail $n^{12}$ holding both parts against separation or unintentional motion in their groove. In operation, member $b$, by its point $n^{17}$, takes and lifts the old loop over hook $n^6$ for knitting, by positive motions in respect to $n^6$, and, when desired, receives a loop or bight from hook $n^6$ on its end point $n^{20}$, for the purpose of transferring the loop or bight, or a previous loop carried by the received loop, to a needle of the other carrier. Preferably, the loop transferred is the loop of the last course previous to that containing the loop carried by point $n^{20}$, the transferred loop thus being under the throat $n^{18}$, and not the same loop impaled upon the point $n^{20}$ at the time of the transfer.

*Operation of the needles.*—The dial needles are operated by cams carried by the dial cam cap D', severally comprising knitting cams and transfer cams adapted to be independently positioned, and corresponding respectively to the cooperating knitting cams and transfer cams for the cylinder needles.

Assuming the machine to be adjusted for making the illustrative product shown in Fig. 34, the principal operations are first, to begin knitting by cooperation of the dial and cylinder needles for a setting-up course; second, to make fabric for a welt, while needles of one carrier remain idle; third, to knit ribbed fabric; fourth to make loose-courses; fifth, to transfer the dial loops to the cylinder; and sixth, to knit a plain-fabric leg, heel, foot and toe for the stocking on the cylinder needles, the dial needles being idle and held out of the way during the knitting of the leg, heel, foot, and toe of the stocking.

Referring now to Fig. 3$^a$, these results may be accomplished when the parts $a$ and $b$ of the dial needles are arranged, at the desired times in the operation, first, to remain idle at line $a'$ $b'$, during motion of the ever-active needles in path J, and of the jackless needles in path O; second, for the parts $a$, $b$, to take the paths $a^2$, $b^2$, in relation to so much of the path J of the ever-active cylinder needles as lies between the lines $y$, $y'$; and third, for the parts $a$, $b$, to take the path $a^3$, $b^3$ respectively in relation to previously idle and bare jackless cylinder needles moving in paths $O^2$, $O^1$, and subsequently in path O, J, the needle parts $a$, $b$, then retiring to path $a'$, $b'$.

*Cylinder needle motions.*—Referring now to Fig. 3, the motions of the cylinder needles are controlled by the movable cams 4, 8, 20 and 25 which are automatically moved as mentioned above, to enter and leave position for cooperation with the needle butts. These cams, when entered, begin their actuation at the leading long butt needle $n^{120}$, Fig. 33.

For this purpose, the dividing cam 4, Figs. 1 and 3, may be mounted on a radial slide $4^a$ worked by the lever 487 and a cam carried by one of the thrust bars 460, substantially as shown in my Patent No. 1,148,055. The transfer cam 25, Fig. 3, adapted to act upon the occasionally-active needles to cause them to take the path $O^2$, Figs. 3 and $3^a$, may be similarly carried by a radial slide 26 worked by the lever 24 and cam 23 on the thrust bar 462, Fig. 1, the mounting and operating means for this cam being substantially the same as that shown in my said Patent No. 1,282,958, to move another kind of cam. Such cylinder needles as are affected by the dividing cam 4 are depressed into the groove beneath the leading stitch cam 361, and join the other needles after the other needles have taken yarn and been depressed by the following stitch cam 360. Needles affected by the cam 4 thus are depressed beneath the level of the yarn fed from the yarn feed guide or guides F', Figs. 3 and 17, occupying any of the several operative positions in the yarn feed throat F. Needles normally affected by the cam 4 have not been raised higher than the points 40 of the ring 271, and therefore have not cleared their latches through their loops, if there are any loops upon these needles. The ever-active needles, which are provided with jacks 380, are not affected by the cam 4. These needles are raised by their jacks, as indicated in Fig. 3, to a level substantially as high as that attained by the needles cleared by the cam 361 prior to taking new yarn for a stitch. Whenever the cam 4 is withdrawn, the needles without jacks pass above the cam 361, clear their latches, and knit from a yarn fed from yarn throat F at the cam 360.

The cylinder needles are also adapted to be controlled by cams 8 and 20 moved into and out of contact with their butts, respectively for the purpose of depressing them to the level 41 at the top of ring 271, and for the purpose of giving all of the needles an early clearance, prior to that occasioned by the jacks 380 or occasioned by the cam 361. Cams 8 and 20 are arranged to be removed, if desired, from operation during making of the plain fabric parts of the stocking to avoid any additional stresses on the loops during fine-gauge knitting of the plain fabric parts of the product, and to avoid complication of the heel and toe knitting operation, or whenever the motion of the needles is reciprocatory for any purpose.

The lifting cam 20, see Figs. 3 and 15, may be mounted upon a bell crank lever $8^a$ pivoted on the table B of the machine at $8^b$ and is provided with a spur $8^c$ and an arm $8^d$ having a pin $8^e$, and a pivotal connection $8^f$ to a wire link 139, Figs. 15 and 16, by which link the lever may be swung about the pivot $8^b$ from the position shown in Fig. 15 to an inner position, determined by the stop-screw $8^g$, flush with the inner surface of the cam ring 271. This motion may be given through the bell crank lever 140 (Fig. 16) pivoted on a standard 141 on the table B and having one arm connected to the link 139, and the other to the thrust bar $460^x$, in contact with suitable cams on the drum 120; or by any other suitable pattern-operated connection.

The depressing cam 8 (Fig. 15) is mounted on a lever $20^a$ pivoted at $20^b$ to the table B, and is provided with a limit stop $20^d$ determining the inner limit of motion of lever $20^a$, which is provided with an anti-friction roll $20^c$ in the path of and adapted to react with the spur $8^c$. A spring $20^g$ coiled about the pin $8^e$ and having one end hooked into a hole in the arm $8^d$ tends to hold the parts in the position shown in Fig. 15, with the cam 8 in action and the cam 20 out of action.

In the normal operation of the machine both cams 8 and 20 are withdrawn, as indicated by dotted lines in Fig. 15. Whenever it is desired to clear all the needles, for instance as explained below, after knitting the setting up course for the welt W, Fig. 34, or to clear the needles of previous loops prior to removing the yarn for pressing off the work at the completion of an article, cam 20 is entered. Cam 8 is entered whenever it is desirable to depress any of the needles below the level of the parts 40. Entrance of the cams 8 or 20 into operative position may be in two stages, the first inserting the cam into position to contact with the leading long-butt needle, and the second stage occurring during passage of the long-butt needles, and taking the cam into position to contact with the short butts also.

The operation of the depressing cam 8 assures that all of the needles not lifted by jacks 380 shall reach the level 41 and be in range of cam 25.

*Dial needle motions.*—For rib knitting, in the specific form in which the dial needles are operative as secondary needles, it is contrived to knit upon them in the radial plane $y$ Figs. 3, 4 and 5 following, in the rotation of the machine, the radial plane $k$ at which the cylinder needles knit. The dial needles are thus supplied with yarn by the runs of yarn lying between the hooks of the cylinder needles, and the rib or back wales $b^{10}$, $b^{12}$, $b^{14}$, $b^{16}$, etc., Figs. 35 and 36, knit by the dial needles are formed of these runs of yarn.

Preferred means for giving the dial needles their motions will be understood by reference to Figs. 2, 4 and 18 to 23 inclusive. The dial cam cap $D^1$ carries cam rings $d^6$ defining between them a broad concentric groove $d^7$. Movable needle operating cams are interposed in this groove, and certain fixed cam margins of this groove cooperate with the interposed cams.

The knitting cams may comprise the cam 13, for advancing the hook parts $a$ of the needles, the cam 12 for advancing the point parts $b$ of the needles, and the cam 10, which operates on both the hook member $a$ and the point-member $b$ of the dial needles. The dial cams also include a fixed separator cam 14, and cams for giving the parts transfer movements presently mentioned. Other forms of cams and other means for causing their timely action or inaction may be substituted within this invention.

When the respective butts $n^{10}$ and $n^{16}$ of the hook part $a$ of the needle and the point part $b$ travel in the broad groove $d^7$, the dial needles are in their idle or welting position illustrated in Figs. 18 and 23.

Preparatory to receiving new yarn, both needle members are advanced, respectively by the cams 12 and 13, substantially to the position shown in Fig. 19, in which position the last previous dial loop $f$ will have slipped up upon the shank of the hook member $a$ until over the channel $n^3$, and thus will be in position to be entered from without and lifted by the point $n^{17}$ of the point member $b$. The point member $b$ is now retracted for the purpose of taking this loop on the point $n^{17}$, as illustrated in Fig. 20. This movement is effected by the fixed withdrawing incline 15. The hook $n^6$ of the part $a$ of the needle is now exposed to receive yarn, which is accomplished by the descent of the cylinder needles $n$ with the new yarn Y in their hooks.

This secondary feeding takes place between the planes $y^3$ and $k$, Figs. 3ᵃ, 4, and 21, so that the needle part $a$ upon further recession, draws the dial loop $f^2$ of yarn Y subsequently to knocking-over of the cylinder loop $f'$ (corresponding to the prior dial course $f$) and subsequently to formation of the new cylinder loop $f^3$, and during rise of the cylinder needles between $k$ and $y$, Fig. 3ᵃ. The inward motion of the needle part $a$ is completed, Fig. 22, at the apex of cam 10 (at plane $y$) during that position of the rising cylinder needle $n$ which most relaxes draft upon the course of yarn $f^2$, $f^3$, and during tension on the fabric due to web-holders $w^2$ acting in the direction of arrow $p$ in Fig. 22.

The recession of the dial needles to the point indicated in Figs. 3ᵃ and 22, just within the dial verge $d^2$, would not be sufficient to cast off the previous loop $f$ if the dial needles were any of the kinds of needles customarily employed. But outward motion of the points $n^{17}$ aided by the tension on the fabric of the tensioning web-holders $w^2$, now lifts the loops $f$ off the needle parts $a$, the advance of the point member $b$ as indicated in Fig. 22 being effective to release the loops $f$ and drop them onto the new loops $f^2$ whenever motion of the points $n^{17}$ is sufficient to cause the loop carried by it to slope outwardly.

This loop-lifting and cast-off movement of the point-members $b$ is effected by the outthrow surface 11 of cam 10 (Fig. 4).

The dial needle parts $a$ and $b$ are now returned to their idle position by the cam slopes 10ᵃ and 10ᵇ respectively (Fig. 4).

*Loop transfer motions.*—Referring now to Figs. 3ᵃ, 5 and Figs. 25 to 29 inclusive, when a sufficient extent of rib knitting is completed (to form for instance the top T of the stocking shown in Fig. 34) the procedure explained above for making a loose course with the aid of the web-holders $w^2$ and the cam 306 will be resorted to during at least two courses, for the purpose of providing sufficiently open loops on the dial or back face of the fabric for transfer of a complete circular course of these dial or back-face loops to the hitherto inactive cylinder needles, which will continue these back or rib wales as plain fabric wales. For a numerical instance, if the cylinder contains 240 needles $n$, the dial may contain 120 needles corresponding to cylinder needles which are inactive during rib-knitting, and 120 dial loops will be transferred to these previously-inactive needles.

Referring to Figs. 35 and 36, the wales $b^{10}$, $b^{12}$, $b^{14}$, $b^{16}$, are wales to be transferred and it is to be contrived to make the transfer in the loose course $f^{20}$. The wales $f^{11}$, $f^{13}$, $f^{15}$, are standing wales drawn to the face of the fabric and knit by the ever-active cylinder needles $n$, and these wales are not affected by the transfer operation.

For transfer of loops from the dial needles to the cylinder needles, such motions may be imparted to the parts $a$ and $b$ of the dial needles as will cause the heads of these instruments to take the paths respectivly shown at the lines $a^3$ and $b^3$, Fig. $3^a$, in respect to the path $a^2$ taken by the cylinder needles which are to receive a transferred loop.

Bearing in mind that the idle position of the elements $a$ and $b$ of the needles is that at which their points travel at the line $a'$, $b'$, means are provided for drawing in the instruments $b$ to this line, and for then projecting them. Referring now to Fig. 25, let is be supposed that rib knitting has been in progress and that in consequence of the operation described above in connection with Fig. 24, a loose course $f^{20}$ has been formed on the dial needles $a$, $b$, followed by a second loose course $f^{21}$. The dial loops of course $f^{20}$ are now ready to be transferred to the hitherto idle jackless needles standing in line with the dial needles. The cam 25 is therefore inserted to cause the leading long but jackless needles, $n^{120}$, Figs. 3 and 33, and all the remainder of the jackless needles, to take the path $O^2$, Fig. $3^a$. Coincident with this operation, the point members $b$ of the corresponding dial needles are moved inwardly at the line $x^1$, Fig. $3^a$ (by fixed cam $19^a$, Fig. 5, for instance) in respect to the normally positioned hook members $a$, until the point $n^{20}$ is housed in the groove $n^8$, and hook member $b$ is advanced until $a$ and $b$ reach the relation (to each other, to course $f^{21}$, and to needles $n$) illustrated in Fig. 26, the loop of the course $f^{21}$ now being in the notch $n^{21}$ over the point $n^{20}$ of the member $b$, and the hook member $a$ at or near its maximum projection. This is the condition at the line $x^2$ of Fig. $3^a$. The members $a$ and $b$ are now moved in opposite directions.

Point member $b$ continues its outward or advancing movement as shown in Fig. 27, to reach a maximum at and following the line $x^3$, Fig. $3^a$. The member $a$ is meanwhile withdrawn. The cylinder needle $n^{120}$ now passes up the path $O^2$ behind the yarn of course $f^{21}$, and penetrates one of the loops X of the course $f^{20}$, as shown in Fig. 27. Motion of the needle $n^{120}$ continues at least to the height shown in Fig. 28, and during or following this motion the point member $b$ retires to the line $b^4$, Fig. $3^a$, the hook member $a$ retiring to the line $a^5$ of said figure.

The advancing movement of the cylinder needle $n^{120}$ and the following jackless needles, while it occurs in the plane of the member $b$, is permitted by the action of the bevel $n^{19}$ (Fig. 18) of the member $b$, which determines passage of the needle $n^{120}$ to one side of the point member $b$, both the needle $n^{120}$ and the point member $b$, bending slightly to permit this.

When the point members $b$ retire, the needles $n^{120}$ etc., receive both the loop X and one of the bights $q$, Fig. 35, extending from face wale to face wale in the course $f^{21}$. The needles $n^{120}$ and following may now retire into the idle path $O'$ for one revolution of the machine, but these needles are allowed to knit at the next succeeding revolution.

The transfer motions above mentioned of the dial needles may be effected by any desired means, but preferred means arranged for automatic action are provided for entering operating cams to cause the transfer waves $b^3$, $a^3$, in the motion of the dial needles to begin and end in a predetermined relation to the beginning and ending of the transfer wave $O^2$ in the cylinder needles. The butts $n^{10}$ of a segment of the members $a$ may be longer than other butts $n^{100}$ of another segment of the members $a$, and the butts $n^{16}$ of the members $b$ may be longer than the butts $n^{160}$ of a corresponding segment of the members $b$. Preferably the long butts $n^{10}$, $n^{16}$, see Fig. 33, are arranged in a segment coinciding with the long butts $n^1$ of the cylinder needles.

The operating cams for the respective butts of the dial needles are arranged to be wholly withdrawn out of contact with any of the butts; to be entered half-way in to first contact with the leading long butts, and then to be entered all the way in during passage of the long butts to actuate the shorter butts $n^{100}$, $n^{160}$.

Referring now to Figs. $3^a$, 4, 5, 17 and 18 to 29, the relative motions of the parts $a$ and $b$ of the dial needles are such as to enable both their knitting motions and their transfer motions to be effected by independently movable groups of cams. The cams of each group on the dial cap $D'$ may be mounted together on carriers adapted to be moved toward and away from the dial needles.

Referring to Fig. 5, the transfer cams comprise an outthrow cam 16 for the dial needle members $a$, and the cam 17, having a withdrawing slope 18 for the needle members $a$, and a projecting slope 19 for the needle members $b$. The outer ring $d^6$ of the cam cap provides a retracting slope $19^a$ for the withdrawal of the needle members $b$ to the relative positions with respect to the members $a$ mentioned above in connection with Fig. 26. Retraction of the members $b$ for the last phase of the transfer motion is effected by the slope $19^b$ of the ring $d^6$, and retraction of the members $a$ is effected by the fixed cam 14.

The cams 10, 12 and 13 of the knitting cam group are suitably, and by preference adjustably, mounted on a carrier block 615, Fig. 17, having holes guided on vertical pins 616 and 618 on dial cap D, and also having a housing 617 over pin 618 for spring taking against the top of pin 618. The dial cap is cut through at $d^{30}$ to permit the cams carried by the block 615 to enter into contact with the needle butts, whenever the housing 617 is pushed down by the inner end of a lever 613, pivoted at 612 to a bracket 620 attached, for instance, to the latch ring 550.

The transfer cams 16 and 17 are mounted to work through an opening $d^{31}$ in dial cap D' on a similar block carrier 621 normally held elevated by a spring in a similar housing 622 over, and slightly rotatable for adjustment on, a pin 623, Fig. 2. Block 621 has a hole to take over a guide pin 624 fast in the link 630 slotted at 631, and held on the dial cap D' by screw 632. Rotation of block 621 on pin 623 radially adjusts cam 17, so far as opening $d^{31}$ permits. Block 621 is depressed to bring its cams into contact with the needle butts by the lever 614 pivoted at 625 on the bracket 626, which may be a bridge piece fast on pivot 612 and screwed at 627 to the bracket A.

The levers 613 and 614 are operated by the respective thrust bars 461 and 462, the upper ends of which take against pins 629 eccentrically mounted for adjustment at the outer ends of the levers 613 and 614 respectively. (Figs. 1 and 17.)

*Yarn feed means.*—The machine is provided with usual yarn-feeding means for a stocking knitting machine, including a series of pattern-controlled yarn feed guide fingers F' adapted to be lowered into operative position as shown at the left of the series in Fig. 17, and raised to inoperative position. One or more of these yarn guides may be arranged to be actuated for splicing or other auxiliary yarn supply, and for yarn changing by the usual expedients, preferably those of my Patent No. 1,282,958. Except when splicing, the yarn withdrawn from knitting is thrown above the upper surface of the dial cap D', upon which it is taken under the clamp member $c$ and is severed by the shears $c'$, the clamp and severing means being appropriately operated by the lever 611 and one of the thrust bars 460. In order to prevent the withdrawn yarns from passing above the cam carrier block 615, the preferred structure includes a spur $615^a$ projecting radially from the block 615.

The usual brush latch-opener 425, Fig. 3, is preferably employed and the machine may be driven through automatic speed-changing power connections, such as those of my patents above referred to.

*Operation.*—A typical operation, to make the stocking of Fig. 34, is as follows: The previous stocking having been pressed off by lifting all yarn fingers F', and all of the needles consequently being naked, dial and cylinder are automatically dropped to positions III and I respectively, Fig. $2^a$. The dial fins $d^5$ now just clear the recesses $w^3$ of web holders $w^1$. The machine automatically slows down for several revolutions at this time.

Dial cams 11, 12 and 13 are now inserted, and cylinder dividing cam 4 entered to draw down the jackless needles to path O', Fig. $3^a$. All of the dial needles and the ever-active cylinder needles are now in full motion.

One or more, preferably two, of the yarn fingers F' are now dropped to begin knitting by the entrance of the yarn, preferably to feed a main and an auxiliary yarn together for a setting-up course $s$, Figs. 18 and 37. This operation is timed to occur about at line Y', Fig. 33, just before the passage of the last long butt needles $n^{10}$, $n^{16}$, of both series, and dial cams 11, 12 and 13 are withdrawn after the next subsequent passage of the long-butts, to run off the end of the long-butt series, and then wholly withdrawn. The dial needles are thus made idle, beginning at the leading short-butt-needle, in the position of Fig. 18, and each dial needle and each ever-active cylinder needle has in its hook a bight of the yarn for setting-up course $s$, the series of bights overlapping on the following end of the segment of long-butt needles.

The ever-active cylinder needles alone thus begin to knit the first course of welt fabric W, Figs. 18, 34 and 37. During this and the ensuing courses the cylinder is raised toward or to position II, to suitably lengthen the stitches now being drawn by the cylinder needles. The dial is concurrently raised in three steps, one revolution apart, to positions IV, V and VI, on the last of which revolutions the auxiliary yarn finger, if employed, is lifted and its yarn withdrawn and severed. The machine now speeds up to normal speed.

Raising the dial provides room between the verge of the dial and the normally operating web-holders for the welt fabric, which enters under the dial by reason of the normal motion of hooks $w^{10}$ of the web-holders $w^1$ and $w^2$ at needles $n$. The cylinder clearing cam 20 is entered immediately after completion of the setting-up course for the purpose of clearing from the jackless cylinder needles the ends of any yarns which may have engaged them, and then withdrawn.

The plain fabric for the turned welt W thus knit is utilized for preliminary engagement by the serrations on the tensioning web-holders $w^2$, prior to the formation of any ribbed fabric; and in so doing, the fabric of the welt W is folded upon its middle course, constituting the leading edge of the fabric, so that the welt, see Fig. 37, is always in the plane of the ribbed fabric T, when this begins to be formed, and in line with the stress on the fabric maintained by the web-holders. This preliminary arrangement of the welt is made by lowering the dial to position IV, for instance (Figs. 2 and $2^a$)

prior to the completion of the plain fabric for the welt, to cause its engagement with the operating web-holders; see Fig. 18. The web-holders $w^2$ are working at this time with only a normal stroke, and the leading fold of the welt is accurately formed by them, after the engagement induced by lowering the dial and fins $d^5$, during each course at the middle of the extent of fabric between setting-up course $s$ and the needles $n$. (Fig. 18).

This edge fold of the welt W is the top line of the finished stocking (Fig. 34) which should be a straight line; the welt should not be wider than the top T. This has not been attained heretofore in any practice of which I am aware, the usual procedure causing the welt to be expanded laterally, to lie without, instead of in, the plane of the ensuing fabric, and to be irregular on its edge.

I prefer to form enough welt fabric before lowering the dial to ensure the engagement of it with the serrations of the web-holders $w^2$; and to form a welt as long as will insure correct engagement of the tensioning web-holders before rib-knitting, with increased motion of the tensioning web-holders, is begun.

Sufficient fabric for the welt having been formed, the parts are automatically adjusted for knitting the rib top T. The web-holder cam 307 is withdrawn, to give a larger withdrawing stroke to the web-holders $w^2$, the dial is then dropped, to position III, for instance, and the cylinder raised to position II, and dial cams 10, 12, and 13 are entered to begin rib-knitting on the leading long-butt cylinder and dial needles. The first dial loops taken in this relation cast off the retained dial bights of the setting-up course. The effect of the enlarged withdrawing stroke of the tensioning web-holders is thus exerted upon preformed plain welt fabric to predetermine sufficient tension for the initial and following courses of the ribbed fabric. The cam 8 is now entered.

The cylinder and dial are now related as indicated in Fig. 18, and the dial fins or partitions $d^5$ are effective to cooperate with the web-holders $w^2$, now making an abnormal retracting motion at cam 307, to afford proper tension and take-up motion to the fabric to permit rib-knitting. The tension on the fabric can not, however, exceed the measured effort of inthrow cam 308 and plunger 383.

Having knit a predetermined length of rib fabric, preferably the machine slows down for about eight revolutions, and at least two loose courses $f^{20}$, $f^{21}$, are then formed by the operation of web-holder cam 306, as explained above, preparatory to transferring the rib-wales to the cylinder needles.

During the passage of the short butt needles, cams 16, 17 and 25 (Figs. 3, 5 and 33) are entered to first act upon the leading long butts $n^{120}$, $n^{121}$, $n^{122}$ (Fig. 33) and web-holder cam 305 (Figs. 11 and 12) is released, for the purpose of tensioning the transferred loops to hold them in the cylinder needle hooks; and cams 16, 17 and 25 are then further entered to act upon the short butt segments of the respective needles, during passage of the long butts.

The dial stitch cams 10, 12 and 13 (Figs. 4 and 5) are simultaneously withdrawn in two steps, to last act upon the following long-butt dial needles. Web-holder cam 307 is simultaneously released, and is returned to normal position by the thrust of the web-holder butts. Dividing cam 4 (Fig. 3) is simultaneously withdrawn, in two stages, last acting upon the following long butt needles.

The long butt cylinder needles, heretofore idle, which are acted upon by cam 4 at this time have received a transferred loop X (Figs. 27 and 35) at cam 25, but their withdrawal for one revolution with this loop prior to their clearing and feeding for plain-fabric knitting is without effect.

It will be observed that the operation of the long-butt dial needless at cams 10, 12 and 13 does not cease until after the transfer cams 16, 17 have acted once upon each of these needles, which have therefore given up their loops at $x^4$, Fig. 3$^a$. The only consequence of this is that this segment of the dial needles takes a secondary bight of yarn $q$ in courses $f^{22}$, Figs. 24 and 35, and on next passing the transfer cams again transfers this bight to the needle $n^{120}$ and its successors. The first cylinder stitch on the receiving needle is then made through the terminal and the next to the last loops of the extinguished dial wales, and also through the bights $q$ of the next previous cylinder course $f^{22}$.

The transferred section is thus everywhere characterized by initial plain fabric loops drawn through bights of at least two previous courses, and through three bights at the front of the stocking, where garter strain is greatest.

The virtual tuck stitches formed by these transfers effectually close up the fabric at this juncture, the loose courses referred to being obliterated as prominent features of the product.

The transfer cams may be left in action as long as desired without further effect, but it is preferred to withdraw them after about four revolutions and to raise the dial to position VI, out of the way of the subsequent operations. Cam 8 is withdrawn before heel and toe knitting.

During the remainder of the operation, the action of the machine is not different from that of the illustrated type machine of my former patents. Preferably after completing the toe, the last yarn in use is withdrawn and severed, so that the completed product is delivered in a separated state.

While I have described the operation in connection with the specific article shown, it will be plain that knitting might proceed from toe to top, the dial being lowered and the dial needles entered into operation without transfer, which in that case could be resorted to on passage from ribbed fabric to plain fabric.

The ribbed fabric, whatever the direction of knitting, may comprise the entire leg and ankle of a stocking, for instance for ribbed-leg children's stockings. Or a ribbed-top woman's stocking may be knit, the machine devices lending themselves readily to control of stitch-length at all stages of the operation, and permitting loop-length fashioning of the ribbed or of the plain fabric parts, as usual, without change of the usual practices.

It will also be plain that the transferring operation may be arranged to take place from cylinder to dial, by appropriate shift of the improved dial needles to the cylinder and corresponding changes in the cams.

As compared with rib-top stockings made by the usual steps, the product presents a finished welt, accurate in length and evenly folded, and free from the objectionable raw edge on the outside of the fabric characteristic of stockings made by topping with cut sections of string-work fabrics, or by string-work knitting of whole stockings. The welt having been joined to the top in correct position, there is no residual strain tending to flare the welt outwardly; and having been begun accurately always at the same needle (the leading needle of the short butt dial segment) and ended accurately, is irreproachably uniform in appearance. The automatic control, not only of the length of all parts of the fabric by the number of courses knit, but also of the tension on the fabric, results in a superior uniformity of product valuable in garments sold and worn in pairs.

I have not attempted to suggest more than instances of the many modifications which will be apparent to those skilled in the art. One such instance is shown in Fig. 32$^b$, in which the point part $b^z$ of a form of the dial needles is shown as arched at $b^a$ to extend above the highest position taken by a cylinder needle $n^a$ during transfer of a loop carried by point $b^{30}$, to avoid any necessary contact between needle and point part.

The cylinder needles, in this or any other instance, may have hooks flattened at $n^b$ to leave a blunt point at the needle-tip, the better to penetrate a small loop offered to the needle for transfer.

When in the claims reference is made to a single-layer plain fabric or portions of articles of hosiery, it is not intended to exclude plain fabric made by plating or splicing in which two yarns are knitted together as if they were a single yarn, or other variations of plain fabric in a single layer or extent.

I claim:

1. A knitting machine having series of needles and means for knitting on one of said series plain-fabric single-layer portions of articles of hosiery, such as leg or foot portions of a stocking, in combination with means for beginning knitting upon the bare needles articles of hosiery partly of ribbed and partly of said plain-fabric single-layer portions, by first making a setting-up course and welt, means acting thereafter to knit the remainder of the stocking, and means for pressing off the completed fabric.

2. A knitting machine having therein series of needles and means for knitting thereon articles of hosiery partly of ribbed and partly of plain fabric, in combination with means for beginning knitting on the bare needles, means for ending knitting by pressing off the completed fabric, plain and tensioning web-holders and means for operating the tensioning web-holders to maintain a different tension on the ribbed fabric during progress of ribbed knitting from the tension maintained on the plain fabric during plain knitting.

3. A knitting machine having therein series of needles and means for knitting thereon articles of hosiery partly of ribbed and partly of plain fabric, in combination with means for beginning knitting on the bare needles, means for ending knitting by pressing off the completed fabric, web-holders, and means for operating all of the web-holders to aid in knitting plain fabric, and means cooperating with some only of the web-holders to cause them to maintain tension on the ribbed fabric during progress of ribbed knitting by coacting with a previous course of the fabric in the direction of motion of the series of needles for ribbing.

4. A knitting machine having therein series of needles, means for knitting thereon ribbed fabric having an integral tubular welt, and means for knitting fabric sections of plain fabric, in combination with means for beginning knitting on the bare needles and ending knitting by pressing off the fabric, and means for maintaining appropriate different tensions on the forming fabric during each different kind of knitting.

5. A stocking knitting machine having therein series of needles, and automatic means for knitting successively thereon ribbed fabric having an integral tubular welt and fabric sections of plain fabric having heels and toes therein, in combination with means for beginning knitting on the bare needles and ending knitting by pressing off the fabric, and means for automatically changing tension on the fabric for maintaining appropriate different tensions on the forming fabric during each kind of knitting respectively.

6. A stocking knitting machine having therein series of needles, and automatic means for knitting successively thereon ribbed fabric having an integral tubular welt and fabric sections of plain fabric having heels and toes therein, in combination with means for beginning knitting on the bare needles and ending knitting by pressing off the fabric, web-holders, and means for maintaining appropriate different tensions on the forming fabric during each kind of knitting by cooperation of means moving certain of the web-holders differently during each of said different kinds of knitting.

7. A knitting machine having therein movable yarn feed devices, a cylinder needle carrier, and a dial needle carrier for needles adapted to be operated to knit by motion in the directions of their lengths, appropriate series of needles therein and means for knitting thereon ribbed fabric and plain fabric of the same number of wales in integral succession, in combination with means for automatically beginning to knit on the bare needles by introducing yarn to both series of needles, and means acting in respect to the needles of one of said series only for pressing off the fabric acting at the completion of a plain-fabric portion.

8. A knitting machine having therein series of needles, web-holders operating in relation to needles of one of said series used for making plain fabric and means for knitting thereon ribbed fabric and plain fabric in integral succession, in combination with means for automatically beginning to knit on the bare needles, means for pressing off the fabric acting at the completion of a plain-fabric portion, and means automatically acting on certain of said web-holders only to maintain different degrees of tension on the ribbed and on the plain portions of the fabric respectively.

9. A knitting machine having therein a plurality of series of needles adapted to cooperate for ribbed knitting and yarn feeding means automatically controlled to feed yarn to and withdraw yarn from the needles, and means for automatically instituting the beginning of knitting on the bare needles by causing the needles to cooperate with introduced yarn to form a setting-up course upon said needles, means for knitting a section of ribbed fabric upon said needles, and means for knitting plain-fabric portions of the article produced in integral prolongation of each wale of the ribbed fabric section, in combination with means cooperating with one of said series of needles only for clearing the needles of retained fabric preparatory to repetition of the said operations.

10. A knitting machine for automatically making in separate succession articles of hosiery having ribbed portions with welts and plain portions in integral prolongation of each wale of the ribbed portion, comprising in combination needle carriers and a plurality of series of needles, means for making a setting-up course on said series, means for knitting a plain-fabric welt of predetermined extent on one of said series beginning at said setting-up course, means acting thereafter for knitting a predetermined extent of ribbed fabric, and means for knitting plain fabric portions of the article in extension thereof, by transfer of all of the loops on needles of one carrier to needles of the other carrier, in combination with means for clearing from all of said needles the completed fabric.

11. A knitting machine having therein in combination means for knitting plain fabric and means for knitting ribbed fabric in succession thereto, a series of web-holders adapted to be operated normally, and adapted to be operated abnormally to tension the fabric, and means for causing said web-holders to act upon plain fabric preceding the ribbed fabric to tension the ribbed fabric, and means to operate said tensioning web-holders normally.

12. A knitting machine having therein means adapted to be operated to knit plain fabric and ribbed fabric in succession, in combination with plain web-holders and serrated web-holders, and means for causing the serrated web-holders to act on plain fabric preceding the ribbed fabric for the purpose of tensioning the initial and following courses of the ribbed fabric.

13. A knitting machine having therein series of needles, means for knitting ribbed web, and means for knitting plain web in integral continuation of the ribbed web by a wave of motions proceeding along said series of needles, in combination with means for automatically causing different tensions to be applied to the forming web at the knitting wave, during ribbed and plain knitting respectively.

14. A knitting machine having therein means for knitting ribbed web, needles, web holders and other means for knitting plain web, in combination with means for transferring loops of wales of one face of the ribbed web to said needles, and means for automatically changing the relation of the web holders to the forming web for maintaining different tensions on the forming web during ribbed and plain knitting respectively.

15. A stocking knitting machine having therein means for knitting plain fabric parts of the stocking on one series of needles, and means for knitting a section of ribbed fabric, in combination with means for integrally connecting the plain fabric and ribbed fabric by transferring loops of the ribbed fabric to needles of said series, said means being adapted to engage said needles with successively transferred bights of yarn corresponding to several successive courses of the fabric knit on other needles of said series.

16. A stocking knitting machine having therein means for knitting plain fabric parts of the stocking on one series of needles, and means for knitting a section of ribbed fabric, in combination with means for integrally connecting the plain fabric and ribbed fabric by transferring loops of the ribbed fabric to said needles, said means being adapted to engage one segment of said needles with bights of several successive courses of the fabric knit thereon, and another segment of said needles with a lesser number of such bights.

17. A knitting machine having therein means for continuously operating the machine, and rib-knitting means comprising two needle carriers and needles therein, in combination with means for successively knitting relatively complete integrally continuous stockings partly of ribbed and partly of plain fabric, comprising movable yarn guide means and needle actuating devices, for automatically setting-up knitting on the bare needles, web holders and operating means therefor for automatically maintaining knitting tension on the fabric throughout its production, means for passing from ribbed to plain knitting to make a continuous fabric, and means to press-off the fabric at the end of each stocking.

18. A knitting machine having therein means for continuously operating the machine, and rib-knitting means comprising two needle carriers and needles therein, in combination with means for successively knitting relatively complete stockings partly of ribbed and partly of plain fabric integrally continuing the ribbed fabric, comprising means for introducing yarn to the needles, needle cams for the needles of the respective carriers, means for automatically adjusting the needle cams and introducing yarn for setting-up knitting on the bare needles, means for maintaining a different knitting tension on the fabric during making of each of the respective kinds of fabric throughout the production, and means for passing from ribbed to plain knitting and means for casting off the completed fabric from the needles.

19. A knitting machine having therein means for rib knitting including automatic means for welting, in combination with means for predetermining the extent of a section of ribbed fabric following a welt, comprising means for making loose courses, and means for automatically transferring the loose-course loops of one face of the fabric to needles capable of knitting loops drawn to the other face at the conclusion of a predetermined length of ribbed fabric.

20. A rib-knitting machine having therein plain and tensioning web-holders, means for tensioning the fabric by operating the tensioning web-holders differently from the plain web-holders and needle-carriers and needles in combination with means for making loose courses for transfer, including devices acting at predetermined times for interfering with the normal position of all the tensioning web-holders in relation to the knitting wave, whereby to cause abnormally long loops in one or more courses of the fabric.

21. A rib-knitting machine having therein tensioning web-holders interspersed among other web-holders and means for operating them at times to tension the forming fabric needle-carriers and needles and means for knitting by cooperating waves of motion in the needles and means for altering the stitch-length by change of the position of one of the carriers, in combination with means for making loose courses for transfer, including devices acting at predetermined times for interfering with their normal relation of phase of a wave of motion in all of the tensioning web-holders to the knitting wave, whereby to cause abnormally long loops in one or more courses of the fabric.

22. A circular stocking knitting machine having therein needles and means for knitting heels and toes on one segment of the needles, and means for knitting fabric for the instep and front of the leg on another segment, in combination with needles for knitting ribbed fabric, and means for transferring from the ribbing needles to the instep and heel needles loops of the rib wales and bights of yarn corresponding to courses of loops intervening standing wales common to both kinds of fabric, the bights transferred to the instep needles exceeding in number those transferred to the heel and toe needles.

23. A rib knitting machine having therein two series of needles, and means for forming and extinguishing a knitting wave in one of said series in combination with means for entering yarn for engagement by both series of needles to form a setting-up course on the bare needles, and means acting at a predetermined time after entry of the yarn for producing and thereafter maintaining tension on the fabric.

24. A rib knitting machine having therein two series of needles, a dial for one of said series, and means for forming and extinguishing a knitting wave in said dial series in combination with means for entering yarn for engagement by both series of needles to form a setting-up course on the bare needles, and means acting at a predetermined time after entry of the yarn for producing and thereafter maintaining tension on the fabric.

25. A knitting machine having therein two series of needles and means for extinguishing and re-establishing a knitting wave in one of said series, in combination with means for beginning ribbed knitting on the bare needles at a setting-up course, comprising means for entering yarn for engagement by both series of needles, means acting thereafter to extinguish the knitting wave in one of said series, and means acting at a predetermined time between said extinguishment and re-establishment for producing and thereafter maintaining tension on the wales knit by the needles of said series.

26. A knitting machine having therein two series of needles and carriers therefor, and means for forming and extinguishing a knitting wave in one of said series, in combination with means for beginning ribbed knitting, comprising means for entering yarn for engagement by both series of needles, means for thereafter extinguishing the knitting wave in one of said series, means acting thereafter to re-establish said wave, and means for moving the carriers apart acting between said establishment and extinguishment.

27. A circular knitting machine having needle carriers and needles therein arranged for rib-knitting, and cam means for actuating the needles of said carriers to knit, in combination with automatic means for adjusting the needle—actuating cams for one carrier to cease actuation of the needles affected thereby at a certain needle after having operated said needle to take yarn and retire and without having operated the next succeeding needle, and in combination with yarn feeding means automatically actuated to introduce a yarn to the bare needles, beginning at a needle in advance of said certain needle during at least one revolution of the machine preceding said cessation of actuation, whereby to form a setting-up course.

28. A rib-knitting machine having therein series of needles and carriers for the respective series of needles, and means for adjusting the position of one of the carriers to change the length of the stitches knit by needles therein, in combination with means adapted to move the other carrier away from the first-mentioned carrier in stages corresponding to the growth of the fabric knit by the needles of said first mentioned carrier.

29. In a knitting machine, a latch-guard, a supporting bearing for a dial on the latch-guard, and a dial supported thereby, in combination with a lever pivoted to an attachment of said bearing reacting with an attachment of the dial, a pattern surface, and a connection from said lever to said pattern-surface.

30. In a knitting machine, tensioning web-holders, a needle-dial having therein grooves for needles, and having thereon fins laterally spaced from and out of contact with the web-holders and adapted to cooperate with the fabric to hold it against one face of said web-holders.

31. In a knitting machine, means for tensioning the fabric, a needle dial having therein grooves for the needles on one face thereof, and having on another face thereof fins spaced from and between said tensioning means adapted to cooperate with the fabric tensioning means, said tensioning means comprising fabric-seizing serrations over which the fabric is bent by said fins.

32. A knitting machine having therein needle carriers, and a series of web-holders having serrations associated with one of said carriers and adapted to move fabric in engagement therewith with the web-holders, in combination with a series of fins associated with the other needle-carrier adapted to force the fabric into contact with the web-holders, said fins and web-holders having between them a passageway for the fabric.

33. A knitting machine having therein web-holders and two needle carriers, in combination with projections on one carrier opposite certain web-holders distributed among the others for holding the fabric against the other web-holders only during their operation in respect to the other carrier.

34. A cylinder and dial knitting machine having cylinder needles and dial needles corresponding to occasionally active cylinder needles, in combination with tensioning web-holders between said occasionally active cylinder needles and adjacent needles and fins adapted to bend the fabric over the tensioning web holders on the dial positioned between said adjacent needles and the dial needles, there being space for the passage of the fabric between the web holders and the fins.

35. A knitting machine having therein web-holders of recurrent different kinds, one kind being adapted to seize and advance the fabric inward of the needles, and the other kind being cut away next the fabric, in combination with means acting on the fabric to depress it into the spaces of the cut-away web-holders, and into certain contact with the fabric-seizing web-holders.

36. A knitting machine having therein a vertically movable needle dial with fins in combination with another needle-carrier and two series of web-holders on said other needle carrier, said fins alternating with the web-holders of one series and adapted to enter between them in one position of the dial.

37. A knitting machine having therein a needle dial, and a needle cylinder in combination with web-holders on the needle cylinder recurrently of different kinds, one kind having inner ends higher than the other kind and adapted to engage fabric stressed against said higher ends, and fins on the dial standing between said higher ends and adapted to stress the fabric into contact therewith.

38. In a knitting machine, needles and web-holders adapted to engage the fabric behind the needles, in combination with means for withdrawing the web-holders and advancing them for normal operation, and means acting at times for giving an abnormal withdrawing movement to web-holders advanced to the normal extent, whereby to place the fabric under tensile stress.

39. A knitting machine having therein a needle-carrier, and needles therein, in combination with web-holders each having a hold-down hook for the fabric mounted on the needle carrier for movement between the needles, said web-holders comprising intercalated series of plain web-holders and of tensioning web-holders adapted to engage the fabric behind the needles, and means for moving the web-holders.

40. A rib knitting machine having therein needle-carriers and needles therein, in combination with web-holders mounted on one of the needle carriers for movement between the needles thereof and beneath the needles of the other carrier, said web-holders comprising intercalated series of plain web-holders and of tensioning web-holders adapted to engage the fabric behind the needles, means for moving the web-holders, and means on one of said carriers for stressing the fabric against said tensioning web-holders.

41. The combination, in a knitting machine, of a series of plain and a series of serrated web holders, with a web-holder cam-carrier having thereon independently adjustable cams, and automatic means for adjusting one or more of said cams in accordance with the fabric being produced, whereby to determine normal and special operative functions respectively for one kind of web-holder, and normal function for another kind of web-holder.

42. The combination, in a knitting machine, of knitting needles and means for operating them with web-holders having respectively plain ends and serrated ends, a web-holder cam carrier having thereon independently adjustable cams for both kinds of web-holders, and automatic means for adjusting said cams, whereby to shift the operative phase of web-holders with serrated ends in relation to the operative phase of motion of the needles.

43. A knitting machine having therein needles and means for knitting thereon, and tensioning web-holders adapted to seize the fabric within and behind the needles, in combination with means for holding the fabric in contact with said tensioning web-holders, and means for advancing said tensioning web-holders after the needles with which they are respectively associated have knocked over their stitches, and during recession of said needles severally, whereby to knit a loose course.

44. A knitting machine having a needle cylinder and needle dial, adjustable in relation to each other, and operating cams for the needles, in combination with tensioning web holders, cams to actuate said web holders, and fins on the dial to press the fabric over said web holders when the cylinder and dial are adjusted towards each other.

45. A knitting machine having a needle cylinder and needle dial, adjustable in relation to each other, and operating cams for the needles, in combination with web holders, certain of the web holders having toothed edges, cams to actuate all of said web holders normally, and fins on the dial to press the fabric over said toothed web holders when the cylinder and dial are adjusted towards each other, in combination with means for abnormally actuating the toothed web-holders only to place the fabric under tension.

46. A knitting machine having therein needle carriers and needles, and means for altering the length of stitch by change of the position of the carrier in respect to the operative stroke of the needle, in combination with tensioning web-holders having serrated ends acting on the fabric, means for moving the web-holders in a wave in relation to the operation of the needles, and means to change the position of the web-holder wave in the serrated web holders to tension the fabric during draft of yarn by the needles for the purpose of predetermining a different length of stitch.

47. A knitting machine having therein needle carriers and needles arranged for rib knitting and means for operating the needles in waves not coincident for the respective carriers, in combination with web-holders, means for moving the web-holders in a wave in relation to the waves of the needles, and means to change the position of the web-holder wave into coincidence with one of the needle-waves for the purpose of predetermining a different length of stitch by cooperation with the yarn-drawing phase of the respective needle-waves.

48. A web-holder for use in knitting machines comprising a body adapted for sliding motion in a guideway, a fabric hold-down hook and knocking-over throat thereon, and having an edge portion provided with yarn-seizing projections positioned thereon to engage yarns separated in position in the knit fabric from yarns of courses engaged by the hold-down hook when the web-holder is in one of the positions of its sliding motion, and to release said yarns on any motion adapted to release said hold-down hook from operative engagement with the fabric.

49. A web-holder for use in knitting machines comprising a body adapted for sliding motion in a guideway, a fabric hold-down hook and a knocking-over throat thereon, and having an edge portion in continuation of the knocking-over throat provided with yarn engaging notches positioned to engage yarns separated in position in the knit fabric from yarns of courses engaged by the hold-down hook, when the web-holder is in one of the positions of its sliding motion, and to release said yarns on motion of any extent resulting in release of said hold-down hook from operative engagement with the fabric.

50. A web-holder having a body adapted for straight sliding motion in a straight guideway and having at its lower part a hold down arm and at its upper part a fabric hold down hook, a knocking-over edge thereon, and yarn-seizing projections in advance of said hold down hook, substantially as described.

51. A web-holder having a body adapted for straight sliding motion in a straight guideway and having at its lower part a hold-down arm and at its upper part a knocking-over edge, a fabric hold down hook and an operating butt on the same edge of the web-holder, and yarn-seizing projections in advance of said hold down hook, substantially as described.

52. A web-holder for knitting machines comprising a thin flat body adapted to slide in a suitable guideway on one bearing edge of said body, an operating butt formed on one edge of said body, a fabric hold-down hook and a knocking-over throat formed on said edge of said body, and a series of serrations defining an extremity of said body on the same edge as said hook and throat.

53. A web-holder for knitting machines comprising a thin flat bifurcated body having an operating butt at one end, a straight-edged upper arm of the bifurcated portion having therein a hook to hold down the fabric, the upper inner extremity of said arm defining a rounded curve, and being provided with a plurality of projections separated by notches of appropriate size and form to receive and hold runs of yarn lying across the upper arm of the web-holder, upon motion of said web-holder outwardly to engage and inwardly to tension said runs of yarn.

54. Knitting machine having a series of web holders of two kinds interspersed with each other, one kind having serrations on one end for contact with the fabric, the other kind having a fabric hold-down hook and a knocking over edge in advance of said hook on one edge, said last mentioned edge being recessed to provide a space for depression of fabric, the better to engage the fabric with the serrations of the other web holders.

55. A knitting machine having therein two series of needles, operating at an angle to each other for rib knitting the needles of one of said series being two-part needles, one of the parts being adapted and arranged to knit by lifting the old loop toward the position of the other series of needles, in combination with means for operating said part to transfer a loop carried thereby to one of said other series of needles.

56. A knitting machine for making fabrics partly ribbed and partly plain having therein a plurality of series of needles positioned and adapted for coaction for rib knitting, one of said series being of needles each having a part adapted in one range of its motions to carry the old loop over the new loop, and adapted in another range of its motions to carry an old loop into position for transfer to a needle of the other series.

57. A knitting machine for making fabrics partly ribbed and partly plain having therein a plurality of series of needles adapted for coaction for rib knitting, one of said series being of needles each having a part adapted in one range of its motions to carry the old loop over the new loop, and adapted in another range of its motions to carry an old loop into position for transfer to a needle of the other series, in combination with means acting on the transferred loops to hold them in engagement with the needles receiving them.

58. A rib knitting machine having therein needles and means for supporting and operating them as primary and secondary series of needles, the secondary series being two-part needles, one of the parts being adapted and arranged to knit by lifting the old loop toward the position of the primary series of needles, in combination with means for operating said part to transfer a loop carried thereby to a primary needle.

59. A knitting machine for making fabrics partly ribbed and partly plain having therein a plurality of series of needles adapted for coaction for rib knitting, one of said series being of needles each having a part adapted in one range of its motions to carry the old loop over the new loop, and adapted in another range of its motions to carry an old loop into position for transfer to a needle of the other series, in combination with means for actuating the needles to knit ribbed fabric, and cams movable into contact with the needles for actuating the needle-parts for transfer.

60. A knitting machine for making fabrics partly ribbed and partly plain having therein a plurality of series of needles adapted for coaction for rib knitting, one of said series being of needles each having a part adapted in one range of its motions to carry the old loop over the new loop, and adapted in another range of its motions to carry an old loop into position for transfer to a needle of the other series, in combination with cams independently movable into and out of operative contact with said last-mentioned series respectively to cause them to knit and to cause them to transfer their loops.

61. In a knitting machine adapted for knitting partly ribbed and partly plain fabrics, a cylinder needle carrier and a dial needle carrier, and sliding needles in one of said carriers having independently movable loop-drawing and loop-receiving parts, the loop-receiving part being adapted in one range of its motions to carry an old loop over a new loop for knitting, in combination with cams for operating the cylinder and dial needles for rib knitting, and movable cams and means for moving the cams at predetermined times to cause an excessive movement of the loop-receiving part of the two-part needles, whereby to transfer a loop to a needle of the other carrier.

62. A knitting machine for knitting fabrics partly ribbed and partly plain, having two needle carriers, ever-active and occasionally-active needles recurrently interspersed in one carrier, and two-part needles in the other carrier corresponding to the occasionally-active needles, in combination with means for concurrently establishing a wave of motion in the occasionally-active needles, and giving an excessive movement to one part in relation to the other part of each of the two-part needles, whereby to transfer loops to the occasionally-active needles.

63. A knitting machine for knitting fabrics partly ribbed and partly plain, having two needle carriers, ever-active and occasionally-active needles recurrently interspersed in one carrier, and two-part needles in the other carrier corresponding to the occasionally-active needles, in combination with means for concurrently establishing a wave of motion in the occasionally-active needles, and giving an excessive movement to one part of each of the two-part needles in relation to the other part, whereby to transfer loops to the occasionally-active needles; means for tensioning the fabric, and means for causing said means to act during such transfer.

64. A knitting machine having therein needle carriers and needles in series cooperative for rib knitting, needles of one carrier being two-part needles, and means for causing waves of appropriate motion of the parts in respect to each other and the carriers for knitting in said needles, in combination with means for otherwise moving one part of said two-part needles to effect transfer of loops formed on said two-part needles to needles of the other carrier.

65. A knitting machine having therein needle carriers and needles in series cooperative for rib knitting, needles of one carrier being two-part needles, and means for causing waves of appropriate motion of the parts in respect to each other and the carriers for knitting in said needles, in combination with means adapted to be entered into relation with said two-part needles for otherwise moving one part to effect transfer of loops formed on said two-part needles to needles of the other carrier.

66. A knitting machine having therein needle carriers and needles in series cooperative for rib knitting, needles of one series being two-part needles, and means for causing waves of appropriate motion of the parts in respect to each other and the carriers for knitting in said needles, in combination with means adapted to be entered into relation with the needles of each carrier, respectively for causing one part of said two-part needles to take and carry fabric loops into range of needles of the other carrier, and for causing needles of said other carrier to receive such loops.

67. A knitting machine having therein needle carriers adapted to support needles in mutual cooperative relation, needles in one of said carriers, and cams for moving them to knit, needles comprising independently movable parts in the other carrier, and cams adapted to move said parts for knitting, in combination with means adapted to be entered into relation with said needle parts for moving them to cause loops of fabric knit upon them to be moved by one of said parts into position to be taken by needles of said first-mentioned carrier.

68. A knitting machine having therein needle carriers adapted to support needles in mutual cooperative relation, needles in one of said carriers, and cams for moving them to knit, needles comprising independently movable parts in the other carrier, and cams adapted to move said parts respectively to draw and cast off loops for knitting, in combination with means adapted to be entered into relation with said needle parts for moving the loop-casting-off parts abnormally to cause them to engage the fabric differently and move it into position to be taken by needles of said first-mentioned carrier.

69. A knitting machine having therein needle-carriers and needles arranged and adapted to be moved therein for rib-knitting, the needles in one carrier having independently movable parts, and knitting cams for moving the parts of said needles respectively to draw loops and to cast off loops, in combination with other cams adapted to be moved into relation with said parts for moving them respectively to retire and to take a loop of a wale and carry it beyond the positions of needles in the other carrier, for the purpose of extinguishing that wale by transfer.

70. A knitting machine having therein needle-carriers and needles arranged and adapted to be moved therein for rib-knitting, the needles in one carrier having independently movable parts, and knitting cams for moving the parts of said needles respectively to draw loops and to cast off loops, in combination with cams and means for moving them adapted to be moved into relation with said parts for causing them respectively to retire and to take and carry a plurality of terminal loops of a wale beyond the position of needles in the other carrier, for the purpose of extinguishing that wale by transfer of one or more of said loops to a needle of the other carrier.

71. A knitting machine having therein needle-carriers and needles arranged and adapted to be moved therein for rib-knitting, the needles in one carrier having independently movable parts, and knitting cams for moving the parts of said needles respectively to draw loops and to cast off loops, in combination with other cams adapted to be moved into relation with said parts at a different place from the place of operation of the knitting cams for moving them respectively to retire and take a loop of a wale and carry it beyond the position of needles in the other carrier, for the purpose of extinguishing that wale by transfer.

72. A knitting machine having therein two series of needles adapted to knit by cooperating motions of the needle parts, one series being of two-part needles, and means for forming, and supplying yarn to, knitting waves in said series of needles, in combination with means for forming a transfer-wave in the motion of one of the parts only of said two-part needles, in relation to needles of the other carrier positioned to receive transferred loops, and means for so positioning the receiving needles.

73. A knitting machine having therein two series of needles adapted to knit by cooperating motions of the needle parts, one series being of two-part needles, and means for forming, and supplying yarn to, knitting waves in said series of needles, in combination with cams for forming a transfer-wave out of coincidence with the knitting-waves in the motion of one of the parts only of said two-part needles adapted to carry a needle loop to be transferred, in relation to needles of the other carrier positioned to receive transferred loops, and means for so positioning the receiving needles.

74. A rib-knitting machine having therein two series of needles, and means for forming, and for feeding yarn to, knitting waves in said series of needles, one of said waves lagging in phase behind the other, in combination with means associated with the needles last to knit for lifting the old loops over the new to cast-off stitches for ribbed knitting, and means adapted to move said casting-off means to transfer loops cast off thereby to needles of the other series.

75. A rib-knitting machine having therein two series of needles, means for forming, and for feeding yarn to, knitting waves in said series of needles, one of said waves lagging in phase behind the other, and means for establishing and extinguishing the wave of later phase, in combination with means associated with the needles last to knit for lifting the old loops over the new to cast off stitches for ribbed knitting, and means adapted to move said casting-off means to transfer loops cast off thereby to needles of the other series prior to extinguishment of said wave of later phase.

76. In a knitting machine, the combination of a grooved carrier with a needle held to slide therein, said needle having independently movable parts for loop drawing and loop receiving, one of said parts having a point for receiving loops to be cast off and a point for receiving loops to be transferred.

77. In a knitting machine, the combination of a grooved carrier with a needle held to slide therein, said needle having independently movable parts for loop drawing and loop receiving, one of said parts having a point for receiving loops to be cast off and a point for receiving loops to be transferred, said points extending in different directions.

78. A casting-off and transfer instrument for knitting machines having a point adapted to take into a loop drawn by a loop-drawing member from one side, for casting-off, and a point adapted to take into such a loop from the other side, for the purpose of moving the loop for transfer.

79. A casting-off and transfer instrument for knitting machines having an operating butt and two points extending in opposite directions, and adapted for sliding engagement with a cooperating loop-drawing member.

80. In a knitting machine, a sliding instrument for drawing loops, and a sliding instrument adapted to receive loops therefrom in one range of relative motions thereof for casting-off, and having a point adapted to receive loops in another range of relative motions thereof in position to be projected for transfer, in combination with means for moving the instruments through such ranges of motion, severally.

81. An automatic stocking knitting machine having therein a series of cylinder needles, a needle dial, a series of two-part needles in the dial, and means for knitting heels and toes on a segment of the cylinder needles having butts differentiated from the other needles, the dial needles having butts differentiating a corresponding segment of the dial needles from the other dial needles, in combination with means for moving the respective needles to receive and to transfer loops, comprising cams for the respective series of needles adapted to be moved into position in stages first to contact with the differentiated butts of corresponding cylinder and dial needles, and then to contact with the butts of the remaining needles.

82. An automatic stocking knitting machine having therein cylinder needles, a needle dial, two-part needles in the dial, means for knitting heels and toes on a segment of the cylinder needles having butts differentiated from the other needles, and means differentiating a corresponding segment of the dial needles from the other dial needles, in combination with means for moving the respective needles to receive and to transfer loops, comprising cams adapted to be moved into position in stages first to contact with the differentiated butts of corresponding cylinder and dial needles, and then to contact with the butts of the remaining needles, and means for causing cessation of knitting movement of the dial needles subsequently to said transfer operation.

83. In an automatic stocking knitting machine, a series of cylinder needles, stitch cams and means for causing recurrent needles at times to pass the stitch cams without being advanced to knit, in combination with means adapted automatically at predetermined times to cause said recurrent needles to be advanced, a series of dial needles having loop transferring parts, means for causing said parts to move loops knit thereon into range of said advancing recurrent cylinder needles, and means for causing and ceasing knitting movement of the dial needles operative to cease knitting on one segment of the dial needles prior to transfer, and on another segment subsequent to transfer.

84. In an automatic stocking knitting machine, cylinder and dial series of needles, means for establishing and extinguishing waves of motion of the dial needles for rib-knitting and means including pattern-controlled yarn-feeding means for beginning knitting by making a setting-up course on bare needles, in combination with means for changing from ribbed to plain knitting at a predetermined time thereafter, including pattern-controlled means for transferring loops of ribbed wales to cylinder needles not previously operating to knit, and means for operating said previously inoperative needles and other needles to knit the leg, heel, foot, and toe of a stocking.

85. In a knitting machine for making partly ribbed and partly plain fabrics, a series of latch needles, and a series of two-part needles having loop-drawing and loop-receiving parts and adapted to knit by cooperative relative motion of said needle parts, said second series of needles being in line with recurrent latch needles, in combination with means for causing said recurrent needles to be inoperative during rib-knitting on the remaining needles, and means for causing said loop-receiving parts to transfer loops of their needles to said recurrent needles at a predetermined stage of production of the fabric.

86. A knitting machine having therein in combination, complementary series of knitting needles adapted to coact for rib knitting automatically controlled yarn feeding means adapted to introduce yarn to the bare needles, in combination with means for forming a setting-up course of the introduced yarn, means for retiring one of said series of needles, beginning at a certain needle, after they have received the setting-up course, means for knitting plain fabric on the other series, for a welt, and means for causing the retired needles to resume coaction with said other series, beginning at a certain needle, after a predetermined number of courses of welt fabric have been knit, tensioning web-holders and means for actuating said web-holders after forming the setting-up course and before resuming said coaction for rib knitting.

87. A rib knitting machine having therein complementary series of needles, means for forming a setting-up course and means for knitting welt fabric on one of said series, and means for knitting ribbed fabric in combination with means for arranging the welt fabric in a fold having its leading edge in the plane of ribbed fabric subsequently formed on both series of needles, said means for arranging the welt acting prior to the beginning of rib-knitting, and being adapted to continue in action thereafter for the purpose of tensioning the ribbed web.

88. A rib knitting machine having therein complementary series of needles, carriers therefor, means for forming a setting-up course, means for moving the carriers toward and from each other, and means for knitting welt fabric on one of said series, and means for knitting ribbed fabric, in combination with means made operative upon approach of said carriers to each other for arranging the welt fabric in a fold having its leading edge in the plane of ribbed fabric subsequently formed on both series of needles.

Signed by me at New York, county and State of New York, this 13th day of April, 1921.

ROBERT W. SCOTT.